(12) United States Patent
Sumiyoshi et al.

(10) Patent No.: US 8,228,596 B2
(45) Date of Patent: Jul. 24, 2012

(54) IMAGE DISPLAY DEVICE USING LIQUID

(75) Inventors: Ken Sumiyoshi, Kawasaki (JP); Jin Matsushima, Kawasaki (JP)

(73) Assignee: NLT Technologies, Ltd., Kanagawa (JP)

( * ) Notice: Subject to any disclaimer, the term of this patent is extended or adjusted under 35 U.S.C. 154(b) by 1330 days.

(21) Appl. No.: 11/857,236

(22) Filed: Sep. 18, 2007

(65) Prior Publication Data

US 2008/0072468 A1 Mar. 27, 2008

(30) Foreign Application Priority Data

Sep. 27, 2006 (JP) ................................ 2006-262614
Aug. 1, 2007 (JP) ................................ 2007-200968

(51) Int. Cl.
G02B 26/00 (2006.01)
G09F 19/00 (2006.01)
(52) U.S. Cl. ......................................... 359/296; 40/477
(58) Field of Classification Search .................. 40/477; 345/84, 107, 204; 346/140.1; 359/296
See application file for complete search history.

(56) References Cited

U.S. PATENT DOCUMENTS

| | | | |
|---|---|---|---|
| 4,636,785 A | 1/1987 | Le Pesant | |
| 4,811,008 A | 3/1989 | Woolfolk | |
| 5,181,016 A * | 1/1993 | Lee ................................. | 345/84 |
| 6,037,955 A * | 3/2000 | DeBoer et al. ............. | 346/140.1 |
| 7,619,609 B2 * | 11/2009 | Fork .............................. | 345/107 |
| 2006/0197723 A1 * | 9/2006 | Sikora et al. .................... | 345/84 |

FOREIGN PATENT DOCUMENTS

| | | |
|---|---|---|
| JP | 60-37589 A | 2/1985 |
| JP | 60-114828 A | 6/1985 |
| JP | 2005-84309 A | 3/2005 |
| WO | WO 2006033054 A1 | 3/2006 |

OTHER PUBLICATIONS

Chinese Office Action issued Nov. 2, 2011 in corresponding Chinese Patent Application No. 200710159656.8.
Japanese Office Action dated Mar. 8, 2012 for Japanese patent application No. 096135645.

* cited by examiner

*Primary Examiner* — David N Spector
(74) *Attorney, Agent, or Firm* — Sughrue Mion, PLLC

(57) ABSTRACT

In this display device, a pixel constituting a display image is made up of a liquid chamber which can contain liquid. To such a pixel, a liquid supply passage and a liquid discharge passage are connected via a switch. The liquid supply passage, the liquid discharge passage, and the pixel together constitute a flow passage. The switch is configured to control the passage and blockage of liquid in the flow passage. Further, the transfer of liquid into and out of a pixel is performed by liquid transfer means.

20 Claims, 35 Drawing Sheets

IMAGE DISPLAY DEVICE USING LIQUID

This application is based upon and claims the benefit of priority from Japanese patent application No. 2006-262614, filed on Sep. 27, 2006, and Japanese patent application No. 2007-200968, filed on Aug. 1, 2007, the disclosure of which is incorporated herein in its entirety by reference.

BACKGROUND OF THE INVENTION

1. Field of the Invention

The present invention relates to a display device for displaying an image by using liquid, particularly to a display device having a memory effect.

2. Description of the Related Art

Currently, printed matter is widely used for the purpose of advertisements etc. Although printed matter cannot be visually identified when there is no lighting, they can provide a full color printing and the like without consuming electric power etc. They also can be produced in a large volume and are inexpensive. However, when the printing content is frequently changed, it is difficult to cope with frequent changes in a short period of time since the period from a printing step to a display step is long.

To solve this, display devices having a low power consumption have been explored. One example of this includes a display device using electrophoresis. However, this display device has difficulty displaying color, although it can display a black and white image. When displaying an image in color, a technique of adding a color-filter array substrate to the above mentioned display device to display a color, or of laminating a plurality of display devices which produce a different color is adopted. However, when using a color-filter array substrate, a problem arises in which white display luminance is lowered, and it is not possible to obtain a display screen having a sufficient brightness for a full color display etc. On the other hand, when a plurality of display devices are laminated, a problem arises in that the structure becomes complicated and the number of display devices increases thereby becoming expensive.

A display device for overcoming the above described limitation for colorization has been proposed in Japanese Patent Laid-Open No. 2005-84166. Referring to FIG. 1, the operation of this display device will be described. The display device is generally made up of image display plate 72, and a unit for forming segmented fluid stream (hereinafter, designated as a segmented fluid stream forming unit) 71. In segmented fluid stream forming unit 71, a plurality of colored fluids are mixed to obtain desired color liquid. By alternately discharging the desired color liquid and separating fluid from segmented fluid stream forming unit 71 to a flow passage, a segmented fluid stream is formed. Image display plate 71 has one winding flow passage 1. In this flow passage 1, a segmented fluid stream is moved by the discharge operation of segmented fluid stream forming unit 71 and, when it reaches the desired display position, the discharge operation is stopped. In this way, it becomes possible to form a desired image on image display plate 72.

However, the display device disclosed in Japanese Patent Laid-Open No. 2005-84166 has a problem described below.

According to paragraph [0034] of Japanese patent Laid-Open No. 2005-84166, for separating fluid 73 shown in FIG. 2, a liquid which has no compatibility with liquid 4 which serves to provide a display is recommended. When this liquid stream is pressurized by a pump to move to a desired position thereby providing a predetermined display image, it is essential to insert the above described separating fluid to avoid the mixing of liquids which carry pixel information (hereinafter, referred to as an "pixel information liquid stream"). However, because of the pumping pressurization from behind, it cannot be expected that the fluid stream will be uniformly pressurized in its sectional direction. As the result, as the liquid continues to move in pressurizing direction 74, mixing between pixel information liquids takes place as shown in FIG. 2. This mixing will become a more severe problem when the flow passage in an image display plate is long.

According to paragraph [0034] of Japanese Patent Laid-Open No. 2005-84166, the separating fluid may be a gas. However, since gas is compressed when it is pressurized, its volume is easily changed. Therefore, to avoid mixing between pixel information liquids, the use of a gas is not preferable.

As so far described, according to the technique disclosed in Japanese Patent Laid-Open No. 2005-84166, it is difficult to move fluid in a stream, in which pixel information liquid and separating fluid are alternately disposed (hereinafter, designated as a "pixel information liquid stream"), in a stable condition.

Then, it may be expected that providing a large amount of separating fluid and a large interval between pixel information liquids can prevent the mixing of a pixel information liquid stream.

However, in this case, since the volume of the separating fluid increases, the volume ratio of the pixel information liquid on the image display plate will decrease. Therefore, the area ratio of the pixel region to be used for display will decrease, thereby causing a problem that the displayed image becomes dark.

SUMMARY OF THE INVENTION

It is a major object of the present invention to provide a display device in which during the transfer of liquid droplets for image display, it is possible to transfer the liquid droplets which serve as pixels without the liquid droplets become mixed together. Moreover, it is also an object thereof to solve the above described problem other than the problem of the mixing of liquid droplets during transfer.

The display device of the present invention can achieve the above described objects by providing a pixel made up of a liquid chamber which can contain liquid, a switch to control the passage and blockage of liquid, a liquid supply passage and a liquid discharge passage which are connected to the above described pixel via the above described switch, and liquid transfer means for transferring liquid into and out of the above described pixel. Thus, according to this configuration, since each liquid droplet which serves as a pixel can be separated from each other by the switch, mixing between liquid droplets will not occur during the transfer of the liquid droplets.

Further, in this display device, there is considered a variant in which the pixels are connected in series such that a liquid discharge passage provides a liquid supply passage. This configuration makes it possible to perform a two dimensional display by means of a plurality of pixels by meandering the series connected pixels. In this case as well, the switch between pixels prevents liquid droplets from being mixed with each other, thereby enabling a stable liquid transfer.

Further, when fabricating a display device for performing a matrix display, it is possible to construct pixel rows or pixel columns by means of the above described series connected pixels. This enables a more rapid image formation since the transfer distance of the liquid is decreased compared with a configuration in which one flow passage including a plurality of pixels are meandered to perform a matrix display.

Moreover, in a display device such as described above, by connecting liquid mixing means for mixing a plurality of liquids to the pixel at the far end of the above described series connected pixels, it becomes possible to create a color display image by using liquid having an arbitrary color.

Further, in the above described display device, a plurality of the above described pixels are disposed, a liquid supply passage connected to each of the above described pixels is a liquid supply passage branched from a liquid supply source, and the liquid discharge passages connected to each of the above described pixels may be bound together into one liquid discharge tank. According to this configuration, creation of a two dimensional image by using a plurality of pixels can be rapidly carried out. Moreover, elimination of an image can be rapidly carried out as well.

Further, in the case of this display device, it is preferable that a plurality of liquid supply sources are provided and that a plurality of liquid supply passages which are branched off from each of the above described plurality of liquid supply sources are connected to each of the pixels. According to this configuration, it becomes possible to rapidly create a color display image having an arbitrary color.

Further, the above described display device is desirably configured such that a liquid supply passage is disposed in the lower layer of the region in which the above described pixels are disposed, and there is provided a matrix electrode for multiplex-driving each of the switches disposed between each liquid supply passage and each pixel.

It is preferable that the switch used in a display device such as described above is made up of a structure which is physically opened in the flow direction and includes a liquid repellent surface, and the liquid repellency of the above described structure is adjusted by the presence or absence of the applied voltage to the above described structure so that the passage and blockage of liquid is controlled. By using this switch, it becomes possible to separate liquid without causing the liquid to remain in the switch. Moreover, since a liquid droplet stays in a pixel between switches, it becomes possible to impart a memory effect to the display state.

The opening part in the flow direction of the switch used in the display device described above preferably is present at one or two locations. Since this will facilitate the liquid passing through the switch compared with a case in which a large number of opening parts exist, it becomes possible to reduce the applied voltage necessary for the switching operation and to increase the display speed.

Further, the liquid transfer means used in the present invention is preferably made up of electric field applying means for selectively applying an electric field to the liquid repellent surface of the structure constituting a switch and to the liquid repellent surface covering the inner wall of a pixel. Alternatively, when a liquid dispersed with electrically charged particles is used, the liquid transfer means is preferably made up of electric field applying means for selectively applying an electric field to the liquid repellent surface of the structure constituting a switch and to the flow passage part excepting for the switch. Thus, by successively switching the position at which an electric field is applied by the electric field applying means, in the liquid transfer direction, it is possible to move liquid droplets in a stable fashion.

Furthermore, the electric field applying means used in the present invention may be a comb-teeth electrode which can apply an electric field in a direction parallel to the display surface. According to this configuration, since the spacing between electrodes can be easily decreased, it becomes possible to reduce the applied voltage for controlling the liquid repellency. By using the display device as described above, it is possible to provide an electronic instrument which enables a full-color display adapted for applications in which content is frequently rewritten.

The above and other objects, features and advantages of the present invention will become apparent from the following description with reference to the accompanying drawings which illustrate examples of the present invention.

DETAILED DESCRIPTION OF THE PREFERRED EMBODIMENTS

First, the basic configuration of the display device of the present invention and applications thereof are described by using the drawings; where, like symbols are used for like functional parts in the following description.

Figure 3:
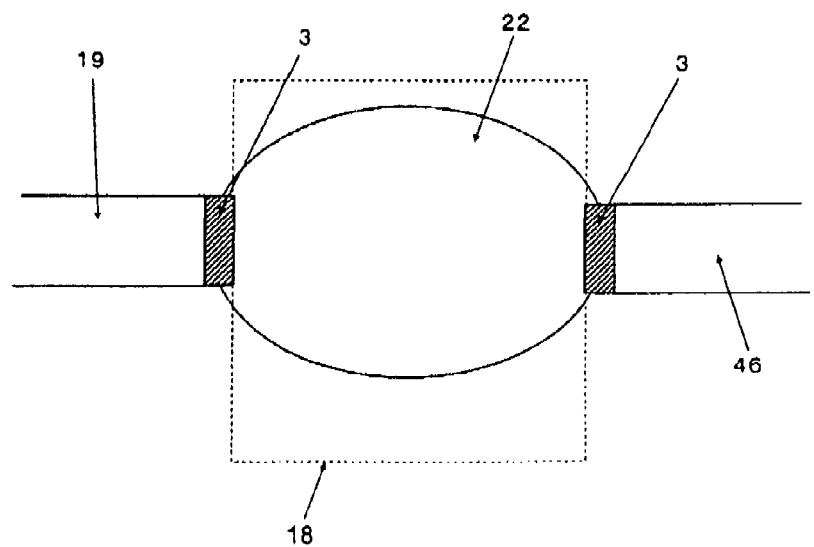
FIG. 3 is a plan view to show the basic configuration of the display device of the present invention.

FIG. 3 shows the basic configuration of the present invention. In the display device of the present invention, pixel 22, which constitutes a display image, is made up of a liquid chamber which can contain liquid. And, such pixel 22 is connected with liquid supply passage 19 and liquid discharge passage 46 via switch 3. Liquid supply passage 19, liquid discharge passage 46, and pixel 22 are surrounded by a side wall, an upper face, and a lower face thereby forming a flow passage. Switch 3 controls the passage and blockage of liquid in a flow passage. Moreover, transfer of liquid into and out of pixel 22 is performed by liquid transfer means 18.

The outline of the display operation of such a device will be described. For example, when the upper face of pixel 22 is configured to become transparent and when the lower face is painted in white, the color of pixel 22 is changed by introducing a colored liquid (ink) into pixel 22 thereby performing a display operation. The colored liquid is supplied from liquid supply passage 19. Switch 3 blocks the liquid from liquid supply passage 19. Upon opening switch 3 on the left-hand side of the figure, liquid is supplied into pixel 22 from liquid supply passage 19. The liquid which has entered into pixel 22 proceeds up to the proximal side of closed switch 3 on the right-hand side of the figure. Thereafter, switch 3 on the left-hand side of the figure is closed. As the result, since the liquid in pixel 22 is trapped, it will stay in pixel 22 unless the right or left switch 3 is opened. As so far described, it is possible to create a display state having a memory effect.

Discharging liquid in pixel 22 is performed as follows: While switch 3 on the left-hand side of the figure is kept closed, switch 3 on the right-hand side of the figure is opened. As a result, due to the capillary effect, it is possible to discharge liquid from inside pixel 22 to liquid discharge passage 46. However, to fully discharge liquid from inside pixel 22, liquid transfer means 18 needs to be concurrently used. The configurations of switch 3 and liquid transfer means 18 will be described later.

Next, an application of the above described basic configuration will be described by using FIG. 4.

Figure 1:
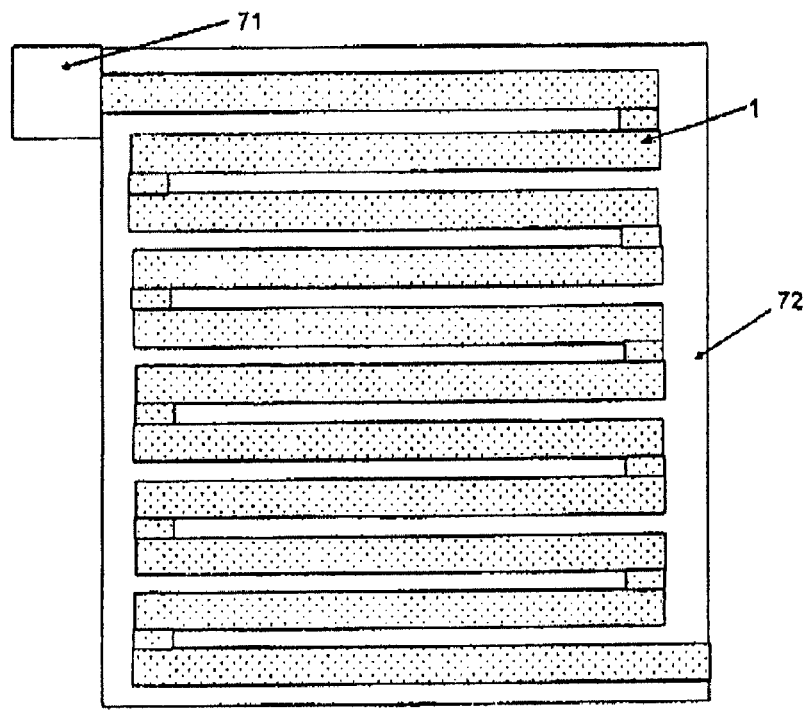
FIG. 1 is a plan view to illustrate the configuration of a conventional display device.
Figure 2:
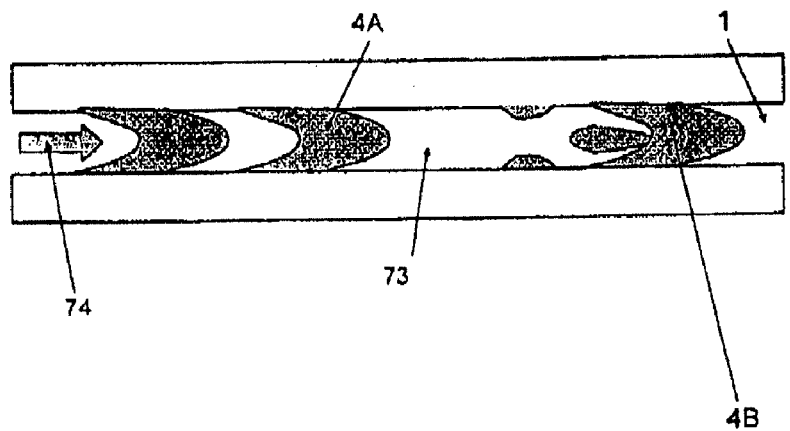
FIG. 2 is a sectional view to illustrate a problem of a conventional display device.

The device shown in this figure is configured by connecting the unit of FIG. 3 in series. That is, liquid discharge passage 46 of upstream pixel 22 is connected to liquid supply passage 19 of pixel 22 positioned immediately downstream such that liquid will be transferred from the left to the right of the figure. Moreover, in the connection passage between pixels, liquid transfer means 18 is disposed. In FIG. 4, liquid supplied from liquid supply passage 19 at the far left end enters into pixel 22 in response to the opening of switch 3. Thereafter, when discharging liquid from pixel 22, liquid transfer means 18 provided between a pixel and a connection passage between pixels is used. As so far described, liquid is transferred to a pixel or to a connection passage between pixels. In the present invention, differing from the technique disclosed in Japanese Patent Laid-Open No. 2005-84166, liquid is separated by switch 3. Therefore, there is no need for a separating fluid as described in Japanese Patent Laid-Open No. 2005-84166. As a result, it is possible to reduce the amount of liquid to be used. Moreover, since liquid is separated by switch 3, there is no risk that a liquid interface will become unstable during liquid transfer which would thus cause of the liquids to mix, and a stable liquid transfer is possible. Further, by disposing the series connected pixels 22 in a meandering shape as shown in FIG. 1, it is possible to configure a display screen.

Next, a further application of the above described basic configuration will be described by using FIGS. 5 and 6.

The display device shown in this figure includes flow passage 1, switch 3, and liquid mixing means 21 connected to one end of flow passage 1 via switch 3. A part of flow passage 1 provides pixel 22 for containing a liquid. Liquid mixing means 21 is a region in which liquid is introduced from each of two supply passages 19A, 19B for supplying liquid A and liquid B, and liquid A and liquid B is mixed. This makes it possible to obtain a colored liquid having the desired color. In FIG. 5, although only one liquid mixing means 21 and two liquid supply passages 19A, 19B are shown, these numbers will not be limited. For example, by mixing four kinds of liquids of red, blue, green and transparent liquids, or four kinds of liquids of yellow, magenta, cyan, and black liquids, it is possible to obtain a colored liquid having an arbitrary color. Thereafter, by opening switch 3, it is possible to send the colored liquid into flow passage 1 including pixel 22.

In this configuration, by connecting the liquid mixing means 21 and flow passage 1 via switch 3, it is possible to separate the time when liquids are mixed from the time when liquids are transferred thereby realizing a stable liquid mixing and a stable liquid transfer.

Moreover, a part of flow passage 1 provides a pixel 22 for containing a colored fluid. In FIG. 5, pixel 22 is formed as a symbol having the shape of an arrow. Therefore, causing a colored liquid to flow into pixel 22 makes it possible to obtain an arrow display having an arbitrary color. The part of the flow passage inner face corresponding to pixel 22 is adapted to have the same color as that of the other part. By doing so, when a colored liquid does not flow into pixel 22, the symbol having the shape of an arrow will not be recognized since one part of pixel 22 cannot be distinguished from the other part. On the other hand, when a colored liquid flows into pixel 22, the color of one part of pixel 22 becomes different from that of the other part, and therefore the symbol having the shape of an arrow can be recognized. In particular, by changing the mixing proportion of liquid A and liquid B in liquid mixing means 21, it is possible to generate a colored liquid having an arbitrary color thereby displaying an arbitrary color.

Figure 5:
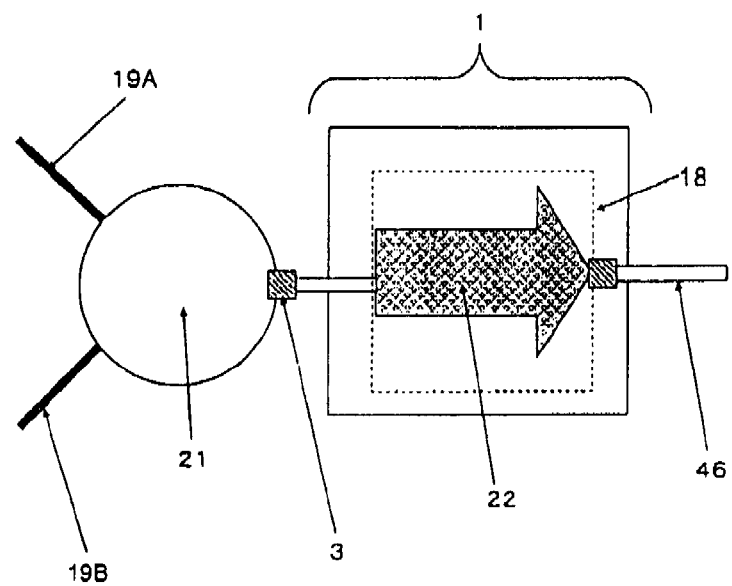
FIG. 5 is a plan view to show a further application of the basic configuration of the display device of the present invention.
Figure 6:
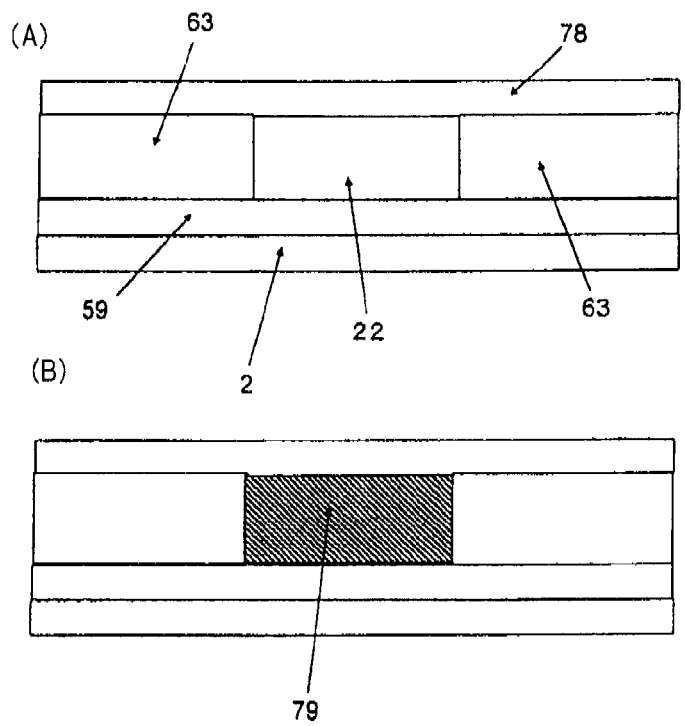
FIG. 6 is a sectional view of the pixel part of FIG. 5.

FIG. 6 shows a sectional view of the pixel part of FIG. 5. Pixel 22 is formed as a gap between substrate 77 including white reflector 59 and transparent substrate 78. In the portion except for pixel 22, upper and lower substrates 77, 78 are bonded together via transparent side wall 63. In the state shown in FIG. 6(A), no colored liquid is introduced into pixel 22, and the pixel region and the non-pixel region appear in white. In FIG. 6(B), since a colored liquid is introduced into the pixel region, the pixel region and the non-pixel region appear in a different color.

In FIG. 5, pixel 22 is formed as a symbol having the shape of an arrow. Therefore, when a colored liquid does not flow into the pixel 22, the symbol having the shape of an arrow will not be recognized since the pixel region and the non-pixel region cannot be distinguished. On the other hand, when a colored liquid flows into pixel 22, the symbol having of the shape of an arrow will be recognized since the pixel region has a color different from that of the other part.

Figure 4:
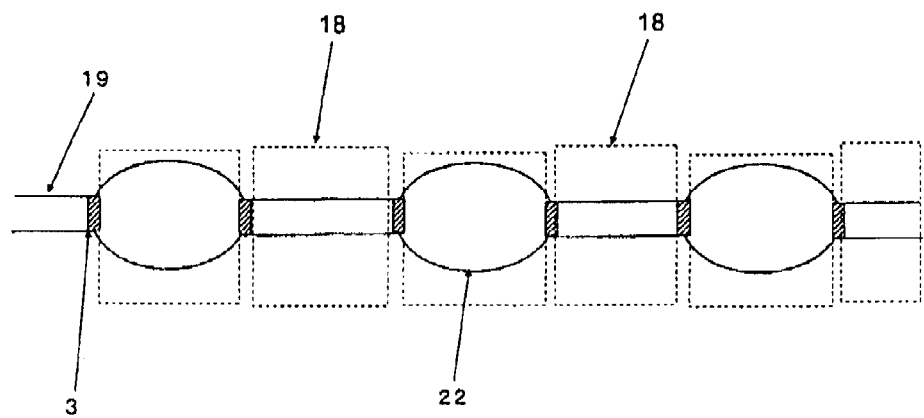
FIG. 4 is a plan view to show an application of the basic configuration of the display device of the present invention.
Figure 7:
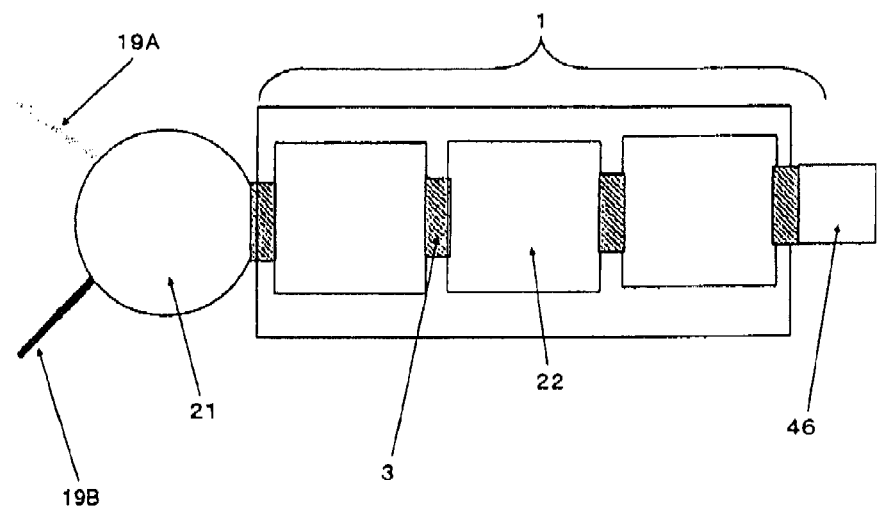
FIG. 7 is a plan view to show a further application of the basic configuration of the display device of the present invention.

Moreover, liquid mixing means 21 may be combined with the configuration of FIG. 4. This is shown in FIG. 7. However, in FIG. 7, liquid transfer means 18 is omitted. In the display device of FIG. 7, pixel 22 is formed at a plurality of portions of flow passage 1, and switch 3 is provided between adjoining pixels 22. According to this configuration, by controlling the open-close operation of switch 3, it is possible to transfer any colored liquid which is mixed by liquid mixing element 21 from pixel 22 at the left of the figure to pixel 22 at the right of the figure. Therefore, it becomes possible to display dots in one direction. Further, as with the conventional example shown in FIG. 1, by meandering one flow passage 1 to two-dimensionally arrange the pixels 22, a matrix display becomes possible. Furthermore, discharge passage 46 for discharging liquid is connected to pixel 22 at the terminal end of flow passage 1 via switch 3. Because of this, when it is desirable to erase an image, it is possible to open switch 3 to discharge liquid in each pixel 22 to fluid discharge passage 46.

Figure 8:
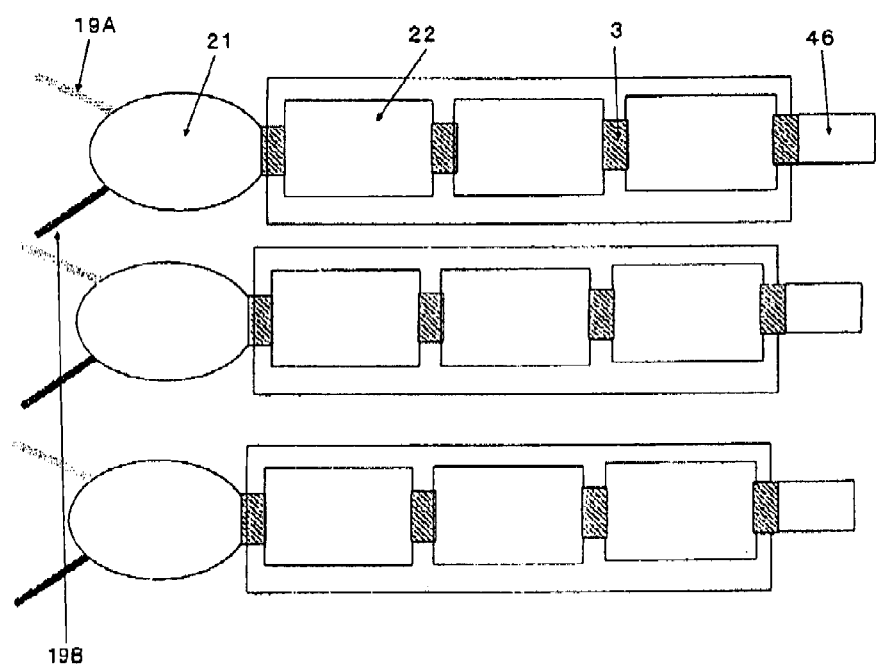
FIG. 8 is a plan view to show a further application of the basic configuration of the display device of the present invention.

Moreover, in the present invention, by arranging the configuration of FIG. 7 for each pixel row or pixel column, it is possible to configure a display screen which enables a matrix display. FIG. 8 shows such a configuration. That is, when forming a dot-matrix type display screen, pixel 22, switch 3, liquid mixing means 21, and the like are linearly disposed as shown in FIG. 8 for each pixel row or each pixel column of the display screen. On account of this, compared with the case in which one fluid passage 1 is meandered in the configuration of FIG. 7 to enable a two dimensional display, it becomes possible to reduce the transfer distance and to update the screen more rapidly. Moreover, although there is shown in FIG. 8 a configuration in which the display device of FIG. 7 is disposed for each pixel row, the arrangement and the number thereof will not be limited by the figure.

Next, a further application of the above described basic configuration will be described by using FIG. 9. In the configuration shown in FIGS. 4 to 8, a liquid droplet having a desired color is produced at one end of pixels connected by a single fluid passage, and liquid is successively transferred to each pixel region of the aforementioned flow passage to perform an image display. In contrast, in the configuration shown in FIG. 9, a plurality of pixels 22 constituting a display screen are two-dimensionally arranged (in a matrix shape), and liquid supply passages (liquid supply passage 19A and liquid supply passage 19B) are directly connected to each pixel 22. Further, switch 3 is disposed at the connection part between each pixel 22 and each supply passage 19A, 19B. This makes it possible to more rapidly supply liquid to pixels 22. That is, in this configuration, liquid mixing is performed in each pixel 22. Moreover, though not shown in the figure, there is provided liquid transfer means 18 in pixel 22.

Further, liquid discharge passage 46 for discharging liquid is connected to each pixel 22 via switch 3. On account of this, when erasing a displayed image is desired, it is possible to discharge liquid in pixel 22 into liquid discharge passage 46 by opening switch 3 of liquid discharge passage 46 to operate liquid transfer means (not shown). In this way, by connecting liquid discharge passage 46 to each pixel 22, it becomes possible to more rapidly erase a displayed image.

Figure 9:
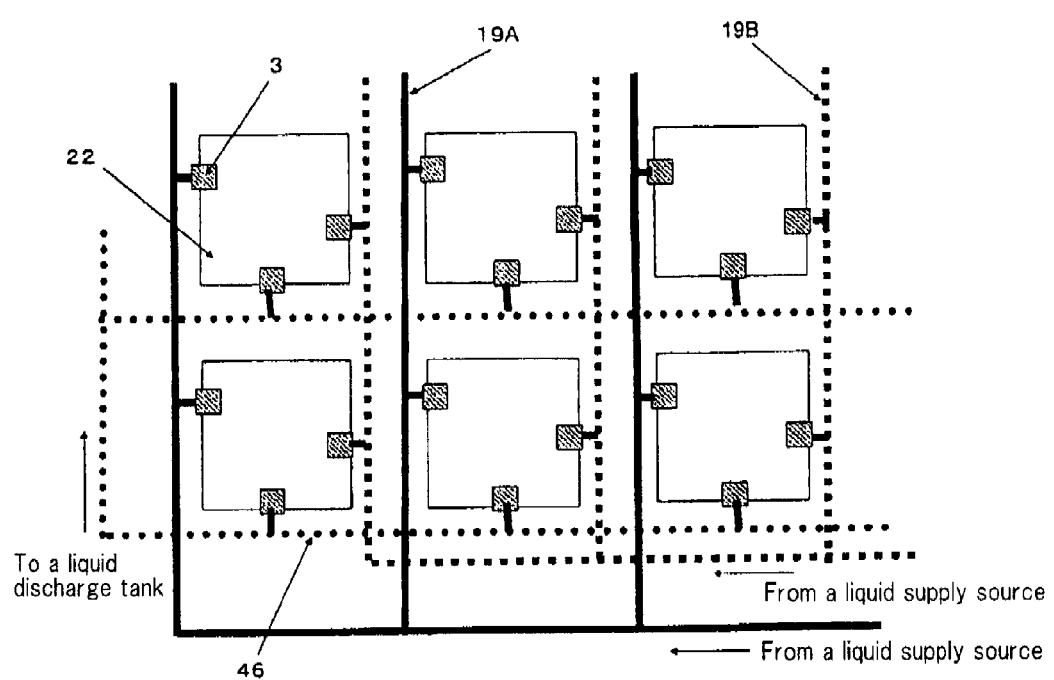
FIG. 9 is a plan view to show a further application of the basic configuration of the display device of the present invention.

Further, in FIG. 9, a plurality of liquid supply passages such as liquid supply passage 19A and liquid supply passage 19B are connected to each pixel 22 via switch 3 respectively. On account of this, by independently controlling switch 3 of each liquid supply passage 19A, 19B, it is possible to inject into one pixel, two kinds of liquids at arbitrary proportions. These liquid supply passages 19A and 19B are branched off from each of the liquid supply sources (not shown) of two kinds of liquids to be connected to each pixel 22. For example, when the above described two kinds of liquids show a different color, it is possible to create an arbitrary mixed color by changing the proportion of these liquids that will be injected.

Moreover, in FIG. 9, a plurality of liquid supply passages 19A, 19B branched off from each liquid supply source are connected to each pixels 22 aligned in the pixel column direction. Further, liquid discharge passage 46 is disposed along each pixel row and is connected to each pixels 22 aligned in the pixel row direction. As well, liquid discharge passages 46 are bound together into a single liquid discharge tank (not shown) on the downstream side.

Figure 10:
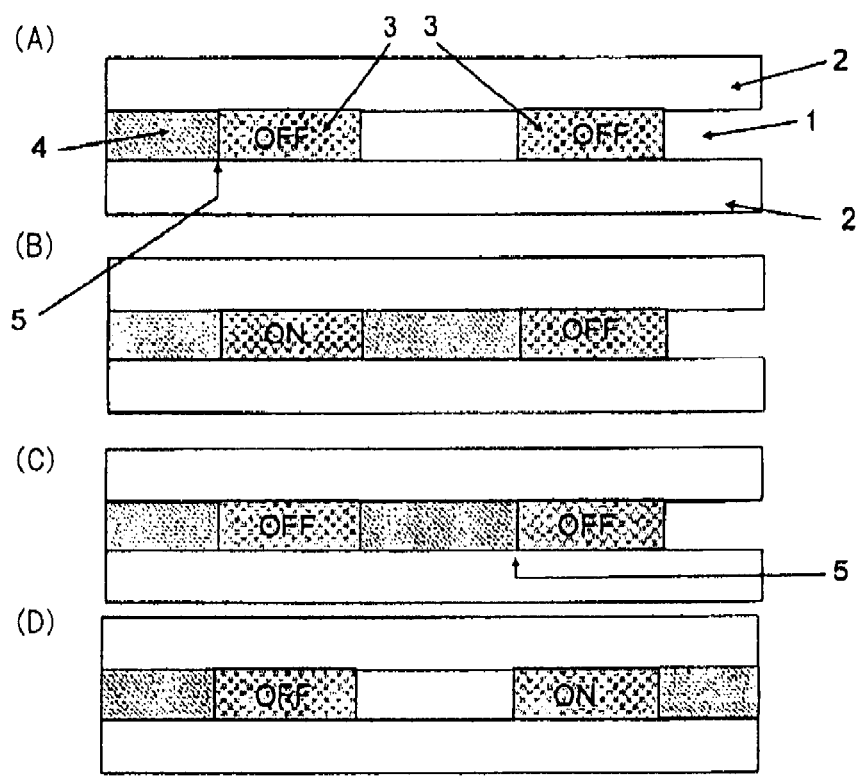
FIG. 10 is a sectional view to illustrate the function of a switch provided in the display device of the present invention.

Next, the function of switch 3 used in the present invention will be described by using FIG. 10. In the present invention, as shown in FIG. 10, switch 3 is disposed in fluid passage 1 formed between two substrates 2. Switch 3 can allow or block the passage of fluid 4 by an on-off operation of the voltage applied thereto. Liquid 4 at the left end in flow passage 1 of FIG. 10(A) is blocked from proceeding by the switch 3 in an off-state. By turning switch 3 into an on-state from this off-state, it is possible to guide the liquid to the middle part of the flow passage 1 as shown in FIG. 10(B). However, liquid 4 will be blocked from proceeding further by switch 3 in an off-state on the right-hand side of the figure. Then, as shown in FIG. 10(C), turning off switches 3 at the left and right of the figure will confine liquid 4 into the middle part of flow passage 1. Then, as shown in FIG. 10(D), turning on switch 3 on the right-hand side of the figure will make it possible to guide liquid 4 at the middle part to flow passage 1 at the right end. Thus, in the present invention, the passage and stoppage of liquid can be carried out by the operation of the switch part.

In the present invention, when switch 3 is turned into an off-state, liquid 4 will not stay in switch 3 regardless of its history. That is, switch 3 in an off-state inhibits liquid 4 from remaining in the region of switch 3. On account of this, once it has passed through a switch 3, liquid 4 will be separated. As so far described, in the present invention, liquid can be separated by switch 3. This separable feature is essential for the stable transfer of liquid droplets described later.

Figure 11:
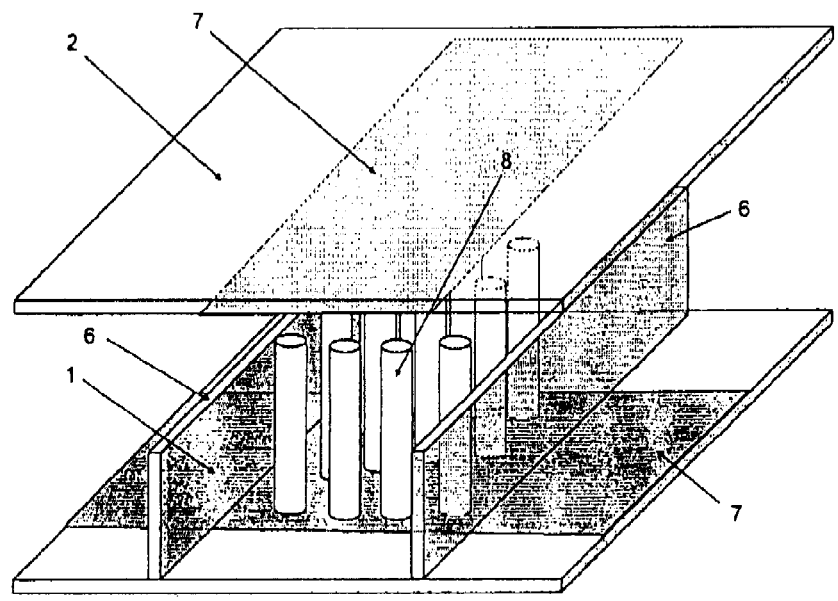
FIG. 11 is a schematic perspective view to show a configuration example of a switch provided in the display device of the present invention.

Further, a more specific configuration example of switch 3 will be described by using FIGS. 9, 10, 11, and 12. For switch 3, a region may be applied in which a structure having a physical opening in the flow direction and having a liquid repellent surface is disposed. This structure can adjust the liquid repellency by voltage supply; an example of this is included in FIG. 11. In FIG. 11, there is formed between two substrates 2 flow passage 1 surrounded by side walls 6. In flow passage 1, pillars 8 having a liquid repellency (hereinafter, designated as a "liquid repellent pillar") are formed so as to be located apart from each other.

The material of liquid repellent pillar 8 can be selected depending on the liquid. For example, when the liquid is hydrophilic, liquid repellent pillar 8 may be made of a lipophilic material or a fluorine-based material. Further, when the liquid is lipophilic, liquid repellent pillar 8 may be made of a fluorine-based material. Alternatively, it is possible to impart water repellency to the pillar surface by modifying the surface after fabricating the pillar with an appropriate material. Liquid repellent pillar 8 can be fabricated in any way by appropriately selecting the material of the pillar itself or the pillar surface. By densely arranging such liquid repellent pillars 8 in a part in flow passage 1, it is possible to make it function as switch 3. When the liquid in flow passage 1 comes into contact with the liquid repellent pillar 8 which is not exposed to an electric field, the liquid cannot enter into switch 3.

An electrode for applying voltage is provided above and below or right and left of flow passage 1. In FIG. 11, electrode 7 is provided above and below flow passage 1. In either electrode arrangement, exposing liquid repellent pillar 8 to an electric field will degrade the liquid repellency of the surface of liquid repellent pillar 8. As the result, it becomes possible for the liquid in flow passage 1 to enter into the region (switch 3) where liquid repellent pillars 8 are disposed.

After the liquid passes over switch 3 and reaches the other side of the flow passage, the voltage supply to electrode 7 is shut off. As a result, the liquid repellency of liquid repellent pillar 8 recovers. On account of this, the liquid in switch 3 is separated into the upstream side and downstream side of flow passage 1. By densely arranging liquid repellent pillars 8, the liquid that has remained in the switch 3 will be eliminated.

As so far described, in the present invention, by arranging structures having liquid repellent surface in flow passage 1 and adjusting the liquid repellency of the structure by the on-off operation of an applied voltage across electrodes 7, it is possible to effect the passage and blockage of the liquid at the switch part.

Figure 12:
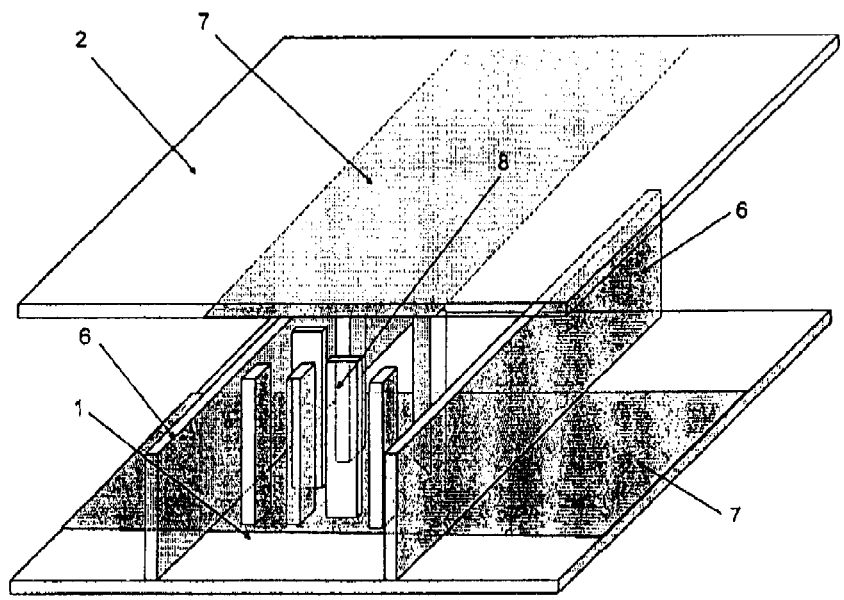
FIG. 12 is a schematic perspective view to show a configuration example of a switch provided in the display device of the present invention.

The construction of the above described liquid repellent structures is not limited to a circular pillar form as shown in FIG. 11 and may be a prismatic pillar configuration as shown in FIG. 12. The structures of FIGS. 11 and 12 can be fabricated by a photolithography process, a printing process, or the like.

Figure 13:
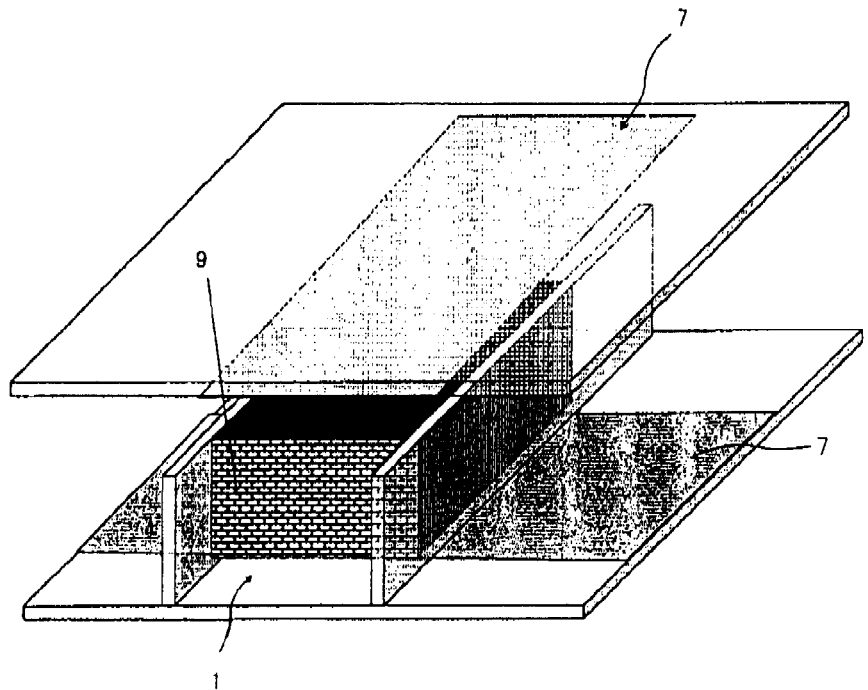
FIG. 13 is a schematic perspective view to show a configuration example of a switch provided in the display device of the present invention.

Further, the construction of the liquid repellent structure may be of porous material 9 as shown in FIG. 13. For example, it may be made of chemical substances such as so-called xerogell and pyrogell. In this case as well, porous material 9 disposed in flow passage 1 still connects the upstream side and the downstream side thereof through physically continuous holes. However, the surface itself of the hole has a liquid repellency. Such liquid repellency can be adjusted by the application of an electric field as described above.

Figure 14:
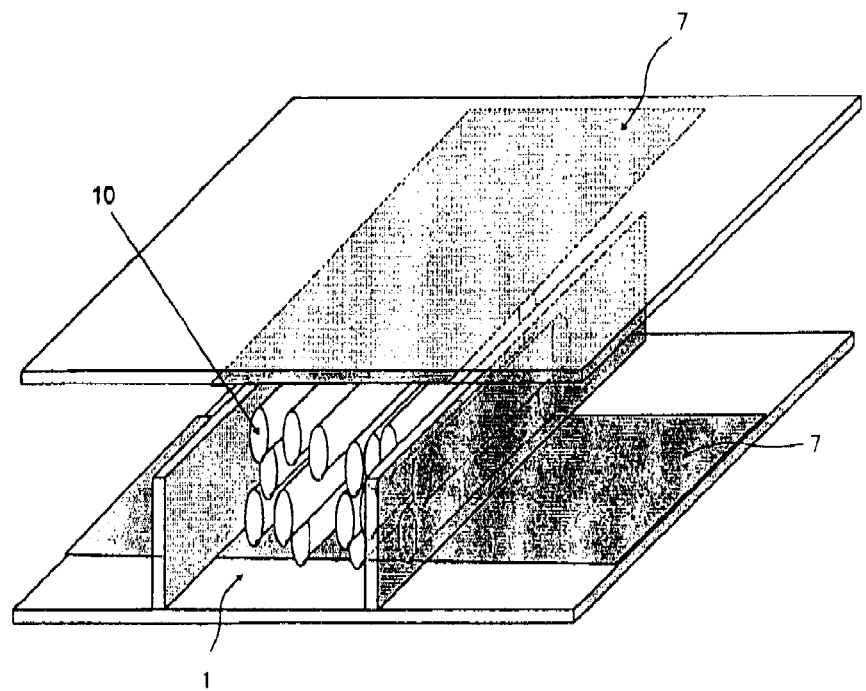
FIG. 14 is a schematic perspective view to show a configuration example of a switch provided in the display device of the present invention.

Further, the liquid repellent structure may be fibrous material 10 as shown in FIG. 14. In this case, fibrous material 10 is disposed in a predetermined area in the flow passage 1 along the flow passage 1, and connects the upstream side and the downstream side thereof through gaps between the fibers. Each fiber surface of fibrous material 10 has a liquid repellency, and this liquid repellency can be adjusted by the application of an electric field as described above.

Figure 15:
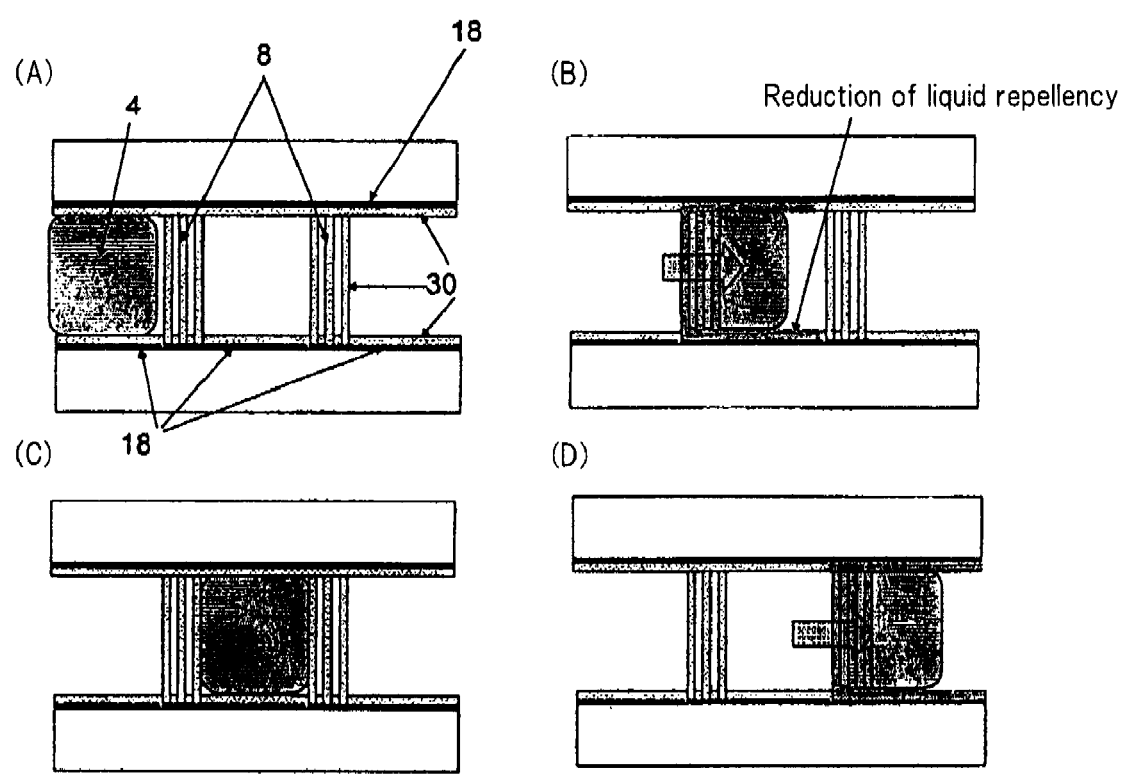
FIG. 15 is a sectional view to illustrate the transfer of liquid in a fluid passage of the display device of the present invention.

Next, liquid transfer means 18 used in the present invention will be described by using FIG. 15. FIG. 15 shows an example in which liquid repellent pillars 8 are used in switch 3. In this case, the flow passage inner wall for transferring liquid 4 is made of liquid repellent surface 30 whose liquid repellency will be reduced upon being exposed to an electric field; and liquid transfer means 18 is made up of switch 3 and electrodes which can apply an electric field to liquid repellent surface 30. In this configuration, when there is a liquid droplet composed of liquid 4 in the flow passage at the left end of the figure as shown in FIG. 15(A), the liquid droplet cannot proceed to the right-hand side of the figure due to liquid repellent pillars 8. Then, upon applying voltage to liquid transfer means 18 which is a pair of upper and lower electrodes corresponding to liquid repellent pillar 8 (switch 3) at the left-hand side of the figure and at the flow-passage middle part (the flow passage part sandwiched by liquid repellent pillars 8 at the left and right of the figure), the liquid repellency of that region will decline and the liquid droplet will move to the flow-passage middle part as shown in FIG. 15(B). Next, upon deactivating the above described voltage application, the liquid droplet stays in the flow-passage middle part (FIG. 15(C)). This state is maintained unless voltage is applied. That is, a memory effect is manifested. Next, upon applying voltage to liquid transfer means 18, which is a pair of upper and lower electrodes corresponding to liquid repellent pillars 8 on the right-hand side of the figure and at the flow-passage right end part, the liquid repellency of the region will decline. In addition to this, the flow-passage middle part has already become liquid repellent. Therefore, the liquid droplet rapidly moves from the flow-passage middle part to the flow-passage right end part. As so far described, by exploiting the switching operation of the position to apply voltage and an electro-wetting phenomenon in the flow passage, it becomes possible to rapidly transfer a liquid droplet without utilizing a pressure pump, etc. Moreover, liquid is prevented from remaining in the flow passage site before the liquid droplet transfer. Further, a flow passage having a liquid repellent surface sandwiched by two switch parts enables a stable stationary state of liquid droplets and a reliable transfer of liquid droplets.

In the configuration of FIGS. 4 and 7, it is necessary to provide liquid transfer means 18 as described above at least for pixel 22 and the connection passage between pixels 22 respectively. Moreover, in the configuration of FIGS. 3, 5, and 9, it is necessary to provide liquid transfer means 18 at least in pixel 22.

Figure 16:
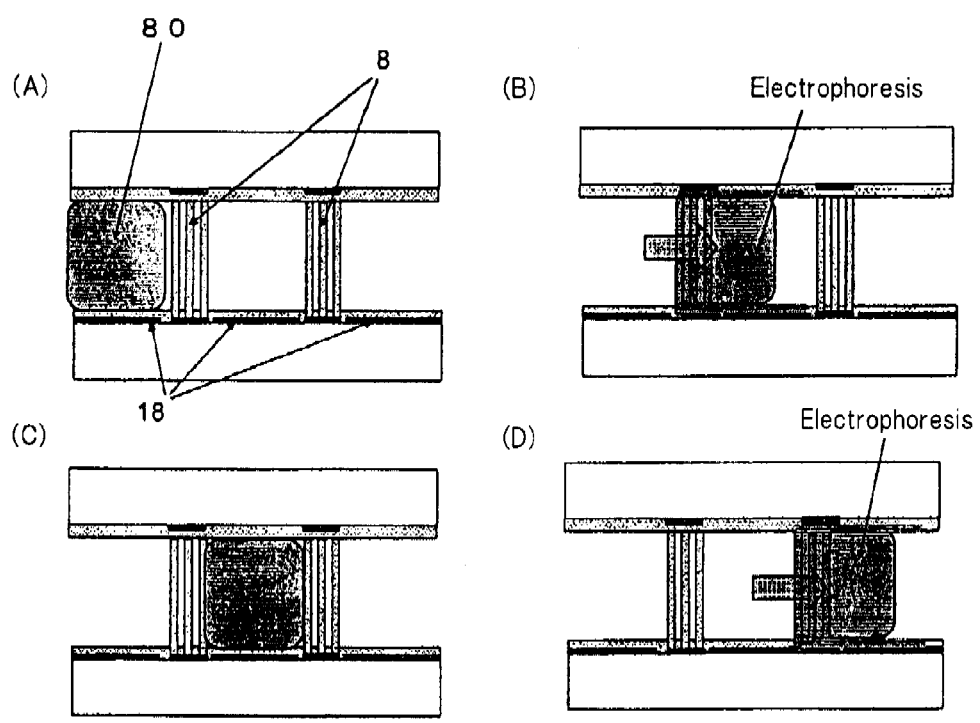
FIG. 16 is a sectional view to illustrate the transfer of liquid in a fluid passage of the display device of the present invention.

Further, without being limited to the liquid transfer utilizing the liquid repellency as described above, in the present invention, it is also possible to carry out liquid transfer by electrophoresis of a liquid in which electrically charged particles are dispersed. For example, referring to FIG. 16(A), the liquid droplet of charged-particle dispersed liquid 80 is located in the flow passage at the left end of the figure. In charged-particle dispersed liquid 80, electrically charged fine particles are dispersed. The charge polarity can be determined by selecting the fine particle. FIG. 16 shows an example in which liquid repellent pillar 8 is used for switch 3. First, an electric field is applied to a switch part made up of liquid repellent pillar 8 on the left-hand side of the figure, and the aforementioned switch is opened. Further, a voltage is applied to electrodes which are the liquid transfer means in the flow-passage middle part (flow passage part sandwiched by liquid repellent pillars 8 at the left and right of the figure). Depending on the voltage polarity, charged-particle dispersed liquid 80 enters into the flow-passage middle part as shown in FIG. 16(B). Thereafter, both voltage applications described above are deactivated. As the result, a stable stationary state of the liquid droplet is obtained as shown in FIG. 16(C). In order to transfer the liquid droplet again, the switch on the right-hand side of the figure is opened to apply voltage to the liquid transfer means of the flow passage part at the right end of the figure. As so far described, liquid transfer is performed by causing droplets to electrophorese. In the present configuration, since the electrophoresis phenomenon is used as the driving force for liquid transfer, there is no need of covering the flow passage inner wall with liquid repellent surfaces as with the configuration of FIG. 15.

Next, referring to FIGS. 17 and 18, a further application of the above described configuration of FIG. 9 will be described. What differs from the configuration of FIG. 9 is that the liquid supply passage directly linked to each pixel 22 is disposed in the lower layer of the display region which is made up of a plurality of pixels 22.

Figure 17:
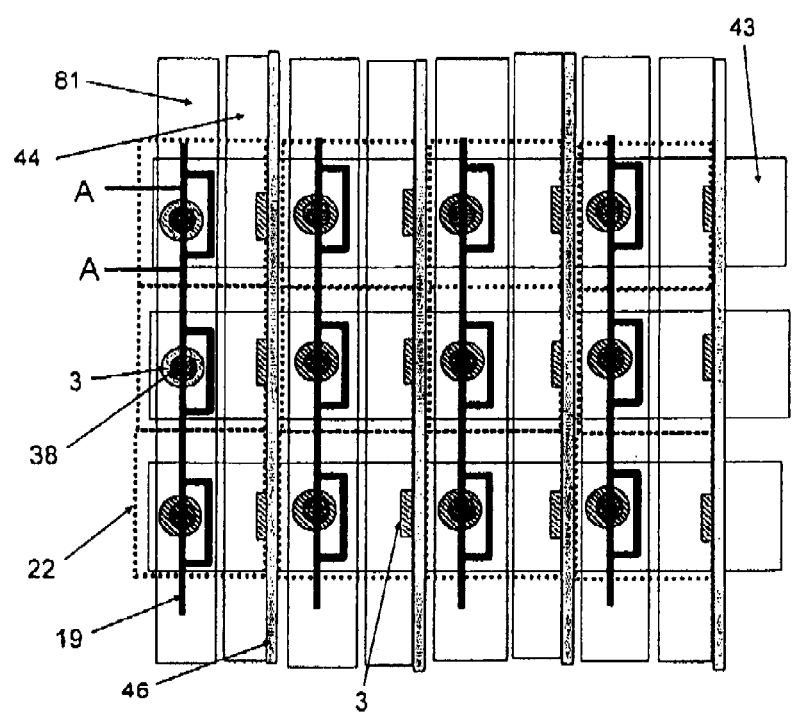
FIG. 17 is a plan view to illustrate a further application of the configuration of FIG. 9.
Figure 18:
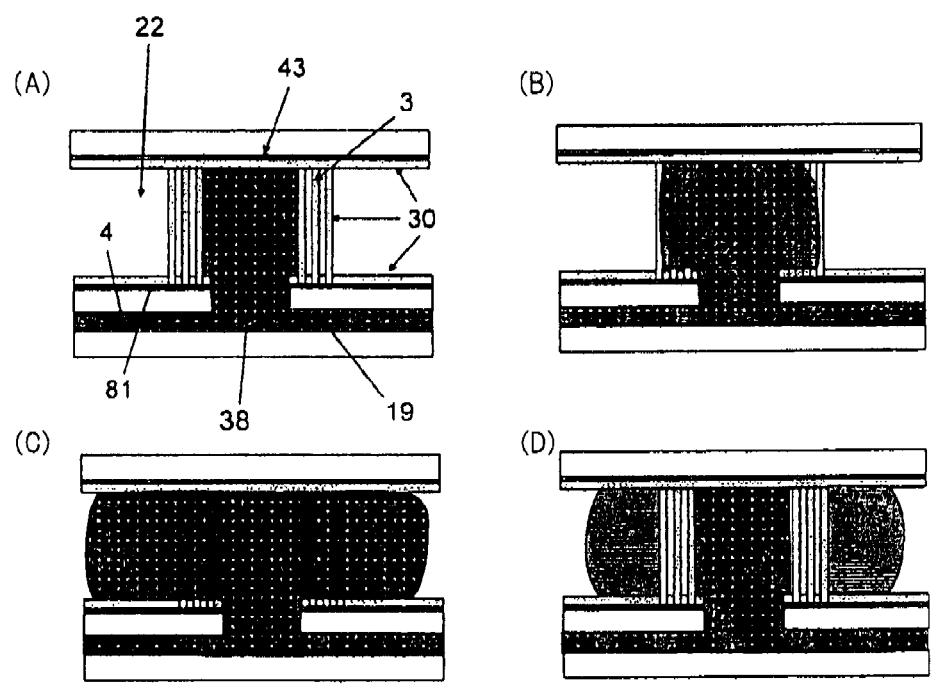
FIG. 18 is a sectional view taken along A-A' of FIG. 17.

FIG. 17 shows a plan layout of the display device. FIG. 18 shows the structure of A-A' section of FIG. 17. As seen from FIG. 18, the present display device is configured such that liquid supply passage 19 is disposed in the lower layer and pixels 22 are disposed in the upper layer. In the lower layer, as shown in FIG. 17, each liquid supply passage 19, which is branched off from a liquid supply source (not shown), is arranged in the direction of the pixel column. On the other hand, in the upper layer, pixel 22 is independently surrounded by side walls (shown by a dotted line) and is connected with liquid discharge passage 46 via switch 3. Liquid supply passage 19 of the lower layer and pixels 22 of the upper layer are connected with each other with a sectional structure as shown in FIG. 18. Specifically, liquid supply passage 19 of the lower layer is connected with pixels 22 of the upper layer via liquid holes 38. Switch 3 is provided in the periphery of liquid hole 38. The inner wall of pixel 22 is configured to be liquid repellent surface 30 whose liquid repellency declines upon exposure to an electric field. FIG. 18 shows switch 3 made up of liquid repellent pillars. As shown in FIG. 18(A), when voltage is not applied to scanning electrode 43 and signal electrode 81, liquid in liquid supply passage 19 of the lower layer forms a liquid face which rises from liquid hole 38 toward the upper layer. This liquid level can be controlled by adjusting the pressure of the liquid supply source. When voltage is applied to scanning electrode 43 and signal electrode 81, switch 3 is opened. Accordingly, as shown in FIGS. 18(B) and 18(C), liquid enters into pixel 22. Thereafter, if voltage application is deactivated, the liquid is separated by switch 3 as shown in FIG. 18(D). As so far described, it becomes possible to supply an appropriate amount of liquid from the liquid supply passage 19 in the lower layer to pixel 22 in the upper layer.

FIG. 17 shows the plan layout of the upper layer and lower layer in a perspective manner. In order to open and close switch 3 in the periphery of liquid hole 38, scanning electrode 43 for selecting the pixel row and signal electrode 81 for selecting the pixel column are disposed in a matrix form. Because of the so far described configuration, by successively selecting scanning electrode 43 and adding a corresponding signal to signal electrode 81, it becomes possible to inject liquid into a desired pixel. Such a matrix arrangement allows the use of a multiplex drive for ordinary display devices.

As so far described, in the present invention, by providing a flow passage to each pixel for each liquid, it is possible to perform a display operation. In particular, since there is no need of transferring liquid from pixel to pixel, it is possible to rapidly create a display screen.

Further, as shown in FIG. 17, liquid discharge passages 46 are disposed for each pixel column and are connected with each pixel 22 via switch 3. This liquid discharge passage 46 may be disposed in the upper layer or the lower layer. Further, in order to open and close switch 3 connected to liquid discharge passage 46, discharge electrodes 44 are disposed along the pixel column. On account of this, when erasing an image, applying voltage to all the scanning electrodes and all the discharge electrodes to open switch 3 of liquid discharge passage 46 allows the liquid in all the pixels to be discharged the liquid discharge passages 46.

Figure 19:
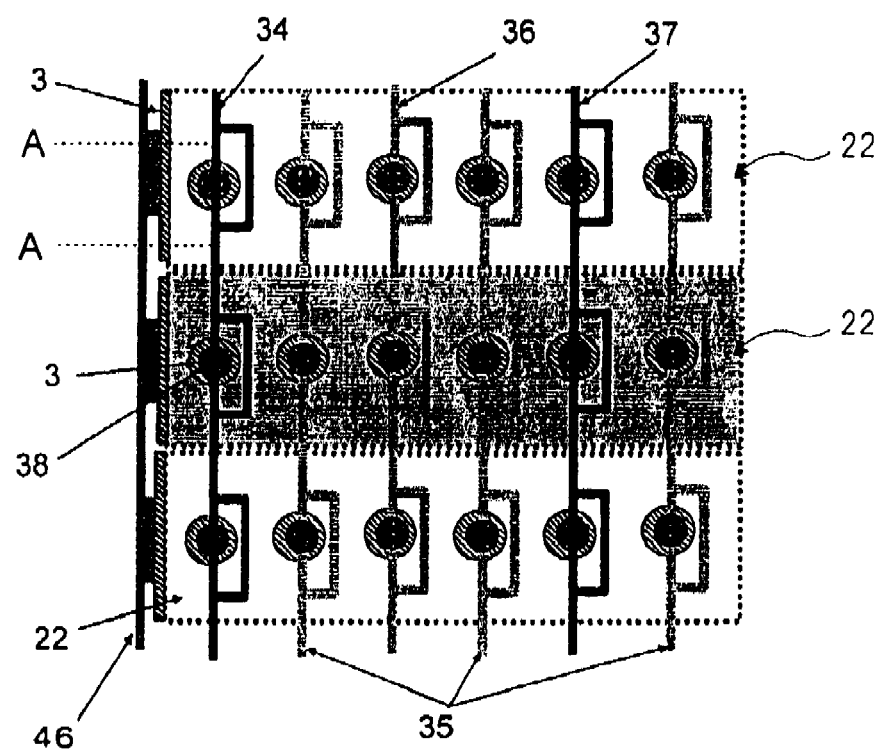
FIG. 19 is a plan view to show a further application of the basic configuration of the display device of the present invention.

Next, referring to FIGS. 19 to 22, a further application of the above described configuration of FIG. 9 will be described. In the configuration of FIG. 17, one liquid supply passage is connected to one pixel via a liquid hole and a switch. In contrast to this, in the display device shown in FIG. 19, a plurality of liquid supply passages are connected to one pixel via a liquid hole and a switch respectively. With specific reference to FIG. 19, three pixels 22 (the site surrounded by a dotted line), each of which is a liquid chamber capable of containing liquid, are aligned in the longitudinal direction (column direction) and respective sections of pixels 22 extend in the lateral direction (row direction). And, six liquid supply passages are connected to each pixel 22 via six switches 3. In FIG. 19, in the lower layer of the plane region in which three pixels 22 are formed, a liquid supply passage R34 for red liquid, a liquid supply passage G36 for green liquid, a liquid supply passage B37 for blue liquid, and three liquid supply passage C35 for transparent liquid are disposed. The number of liquid supply passages is not limited to this example, and liquid supply passages for a necessary number of colors may be disposed. In the display device in FIG. 19, color can be adjusted by red, green, blue and transparent liquids to create arbitrary colors. Moreover, liquid color may be changed to yellow, magenta, cyan, black, and the like. Further, as shown in FIG. 19, a bypass passage is provided in the portion including liquid hole 38, of each liquid supply passage. As the result of this, even when liquid flows out from each liquid hole 38 into the pixel 22 in the upper layer, it is possible to stably supply liquid to the flow passage on the downstream side with respect to the site at which the flowing out has occurred. Moreover, the A-A' section of FIG. 19 may be the same as the structure shown in FIG. 18.

Moreover, arranging pixels 22 shown in FIG. 19 in a matrix form will make it possible to display an arbitrary colored image.

Figure 20:
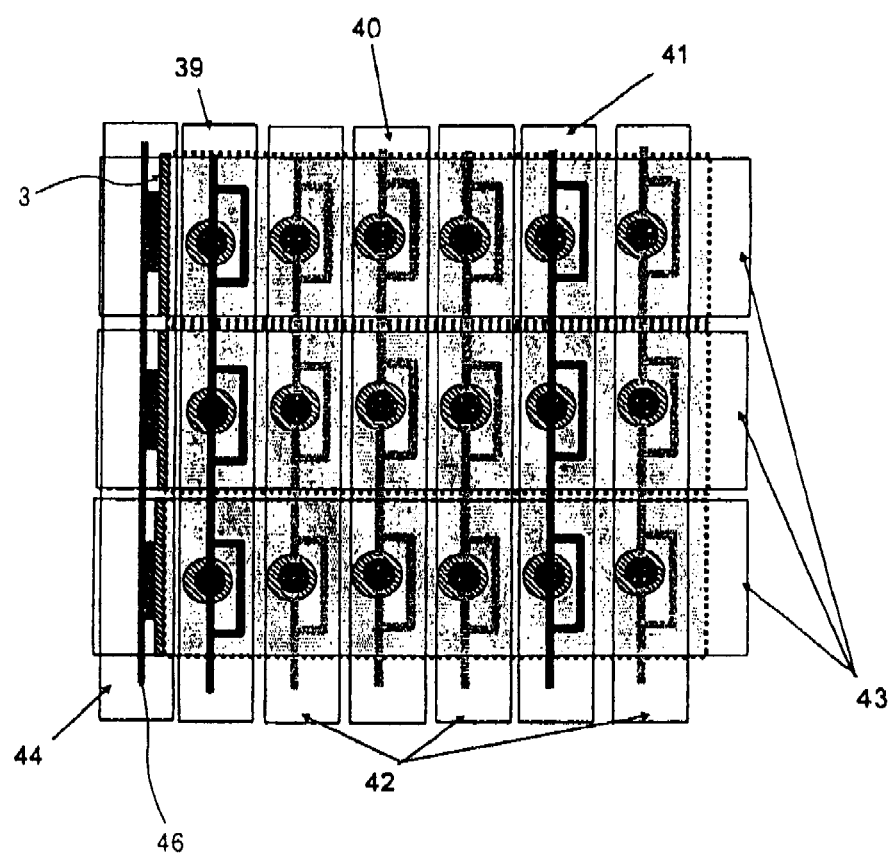
FIG. 20 is a plan view in which an electrode is superimposed on FIG. 19.

FIG. 20 is a diagram in which the electrode structure is superimposed on FIG. 19. In FIG. 20, three scanning electrodes 43 are disposed so as to correspond to each of the pixels extending in the lateral direction (pixel row direction). Further, signal electrode R39, signal electrode G40, signal electrode B41, and three signal electrodes C42 are correspondingly disposed along the liquid supply passage for each color. This will cause switch 3 of each liquid hole 38 to be activated. Moreover, discharge electrode 44 for the liquid discharge operation for each pixel is disposed corresponding to liquid discharge passage 46.

Figure 21:
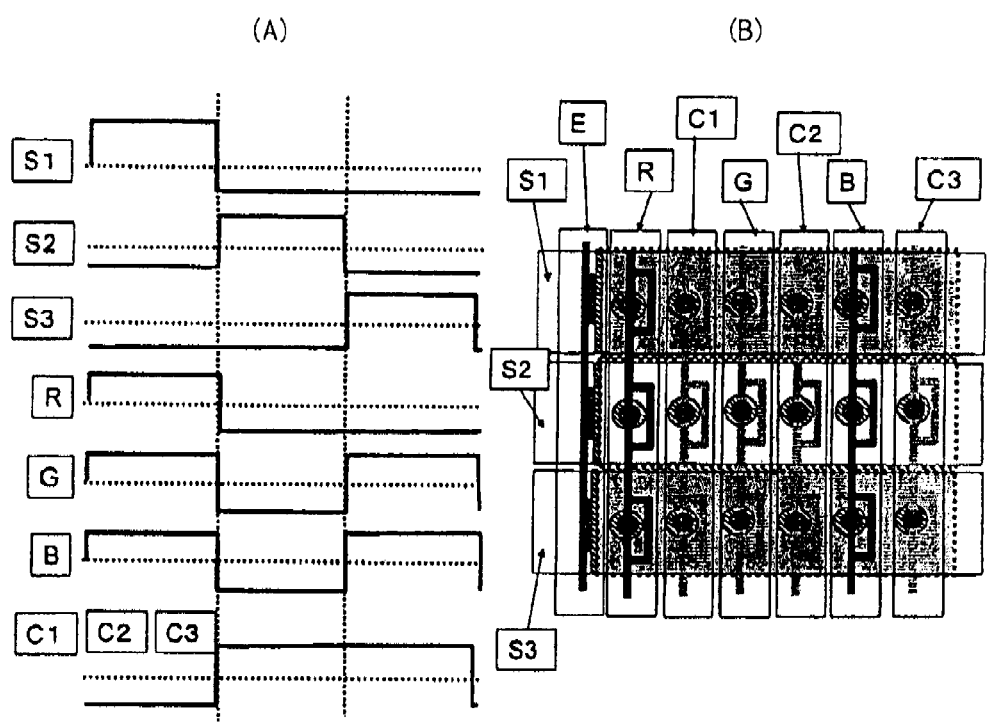
FIG. 21 illustrates the write operation of the display device of FIG. 19, in which (A) is a timing chart of voltage application to each electrode and (B) is a plan view to show the state of liquid droplets in that application timing.

FIG. 21 shows an example of applying voltage to each electrode shown in FIG. 20. Scanning electrodes S1 to S3 are scanned at each timing as shown in FIG. 21(A). On the other hand, voltages shown in FIG. 21(A) are applied to each of signal electrodes R, G, B, C1, C2, C3. For example, at a first timing at which scanning electrode S1 is selected as shown in FIG. 21(A), sufficient voltage will not be applied to switch part 3 for each liquid supply passage of a red liquid (R), a green liquid (G), and a blue liquid (B). On the other hand, sufficient voltage is applied to switches 3 for the liquid supply passage of transparent liquids (C1, C2, C3). As the result of this, only the transparent liquids will be discharged into pixel 22. Therefore, when the base of pixel 22 is a white one, white color will be displayed at the pixel on the first row shown in FIG. 21(B).

On the other hand, at a second timing at which scanning electrode S2 is selected as shown in FIG. 21(A), voltage is applied to switches 3 of the liquid supply passages for red, green, and blue colors, and a three colored liquid will spread in the pixel regions. As the result, a black color will be displayed at the pixels on the second row shown in FIG. 21(B).

Similarly, at a third timing at which scanning electrode S3 is selected as shown in FIG. 21(A), only the liquid having a red color will spread in the pixels as shown in FIG. 21(B), and a red display will be performed.

According to the present configuration, multiple kinds of flow passages for liquid supply are disposed in the lower layer of the pixel region, so that it becomes possible to arrange the scanning electrodes and the signal electrodes in a matrix form as shown in FIGS. 19 to 21. This makes it possible to multiplex-drive switch 3 at the intersection points of such matrix electrodes.

Further, according to the present configuration, it is possible to directly inject liquid of a desired mixing ratio into pixel portions thereby enabling color display of an arbitrary color. As understood from the above description, the inner face of the liquid supply passage does not need to be a liquid repellent surface. Rather, in order to perform a rapid liquid replenishment, it is desirable to have a lyophilic surface.

So far, the write operation to each pixel has been described by using the configuration of FIG. 19. Hereinafter, erase operation will be described by using FIG. 22. In the configuration of FIG. 19, to update the displayed color of each pixel, it is necessary to discharge liquid which has been gathered, from a pixel. Therefore, there are provided in the display device, liquid discharge passage 46, discharge electrode 44, and switch 3 for liquid discharge passage 46 as shown in FIGS. 19 and 20. Although, in FIG. 22, liquid discharge passage 46 is provided in the lower layer as with other liquid supply passages, it may be provided in the upper layer.

Figure 22:
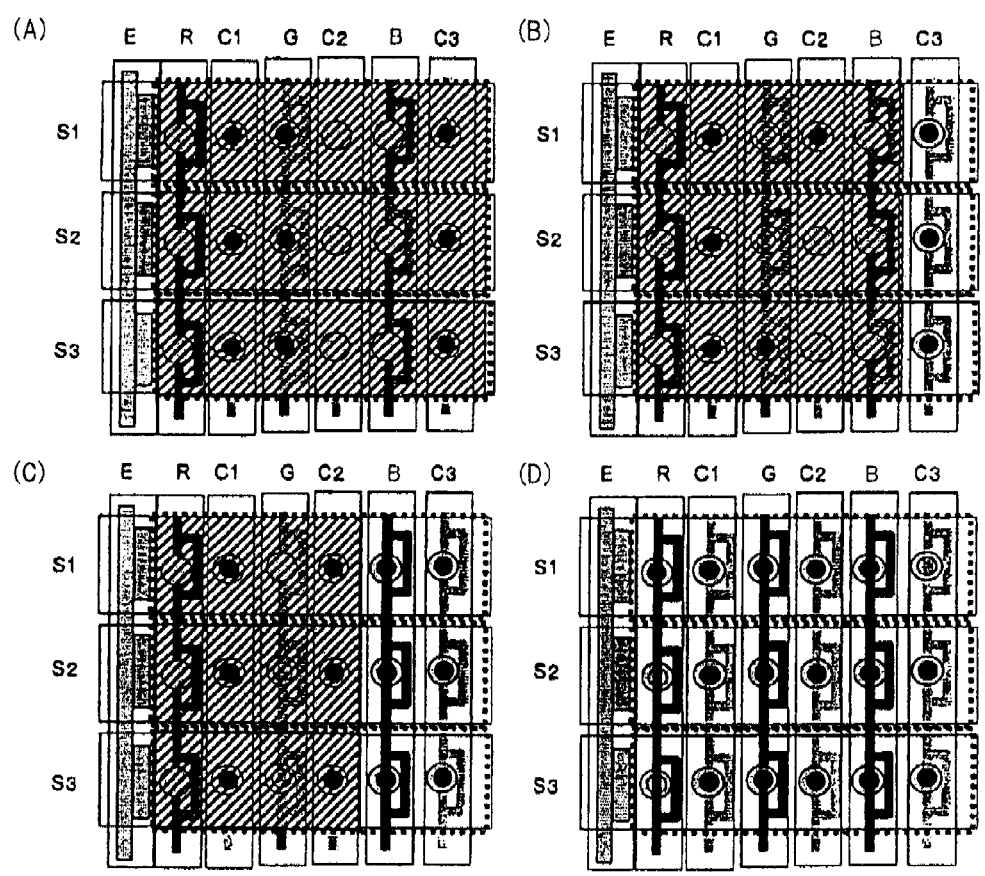
FIG. 22 illustrates the erase operation of the display device of FIG. 19.

In FIG. 22, colored liquid which has already spread in a pixel is shown by a hatching pattern (diagonally shaded area). Further, in FIG. 22, the electrodes of each column are designated as E, R, C1, G, C2, B, and C3 and each of the scanning electrodes are designated as S1, S2 and S3.

FIG. 22(A) shows by a hatching pattern a state in which all of three pixels longitudinally aligned are filled with liquid. In order to discharge liquid from a pixel, all scanning electrodes S1, S2, and S3 are selected concurrently. Thereafter, voltage is applied between column electrodes E, R, C1, G, C2, and B except for electrode C3 and all scanning electrodes S1, S2, and S3. As the result, switch 3 corresponding to discharge electrode E opens thereby allowing liquid to be discharged to liquid discharge passage 46. Liquid discharge passage 46 extends toward the outside of the display device. On the other hand, liquid in the vicinity of column electrode C3 is eliminated since pixel 22 inner face is liquid repellent, and moves to the vicinity of the column electrodes to which voltage has been applied. As a result, the liquid region in the pixel moves to the left-hand side as shown by the hatching region of FIG. 22(B). Thereafter, the application of voltage between column electrode B and all the scanning electrodes is deactivated. That is, voltage is applied between column electrodes E, R, C1, G, C2 excepting for column electrodes B, C3 and all scanning electrodes S1, S1, and S3. As a result, as shown in FIG. 22(C), the liquid region in the pixel moves further to the left-hand side. Hereinafter, by repeating a similar procedure to move the liquid region successively to the left-hand side, it becomes possible to eventually discharge liquid from the pixel to the liquid discharge passage 46 as shown in FIG. 22(D).

Figure 23:
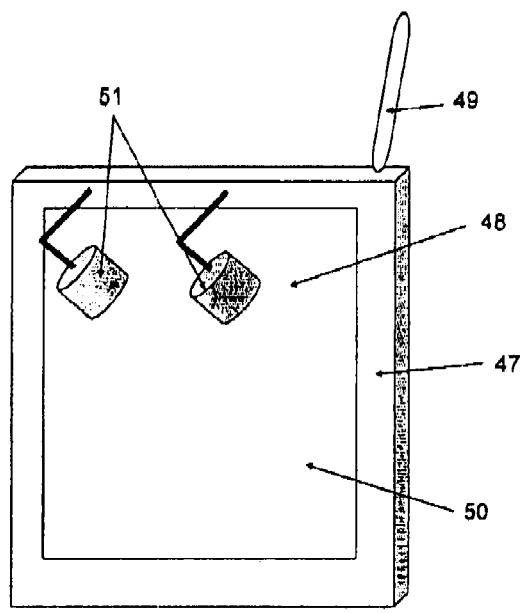
FIG. 23 shows an example of electronic equipment to which the display device of the present invention is applied.

Further, by using the display device shown in FIGS. 3 to 22, it is possible to produce electronic equipment as shown in FIG. 23. In electronic equipment 47 shown in FIG. 23, antenna 49 may be equipped so that write data for the image to be displayed on display device 48 may be received via wireless communications. Further, solar cells 50 may be equipped in the front face or in the back face of display device 48 so that charge operation of display device 48 may be automatically performed. In particular, equipping transparent solar cells 50 in the front face of display device 48 makes it possible to cover a part of power consumption of display device 48.

Further, by equipping a light source in the front face or the back face of display device 48, it is possible to perform a reflection display or a transmission display. The reflection display can be carried out by for example making the base of the pixel region shown in FIGS. 8 and 9 white. In this case, when illumination cannot be expected such as during night time, an illumination device 51 may be lit as shown in FIG. 22. Further, by making the foundation of the pixel region shown in FIG. 8 or 9 transparent, transmission display may be carried out. In this case, a back light, which is used in a liquid crystal display device etc. may be provided inside the electronic equipment 47.

Alternatively, by providing two kinds of bases: white and transparent, for the pixel region shown in FIGS. 8 and 9, it is possible to use both for a transmission display and for a reflection display.

Next, exemplary embodiments of the present invention will be described with reference to the drawings. Moreover, like symbols are used for components which have the same function as the above described components.

First Exemplary Embodiment

A first exemplary embodiment will be described with reference to FIG. 24.

Figure 24:
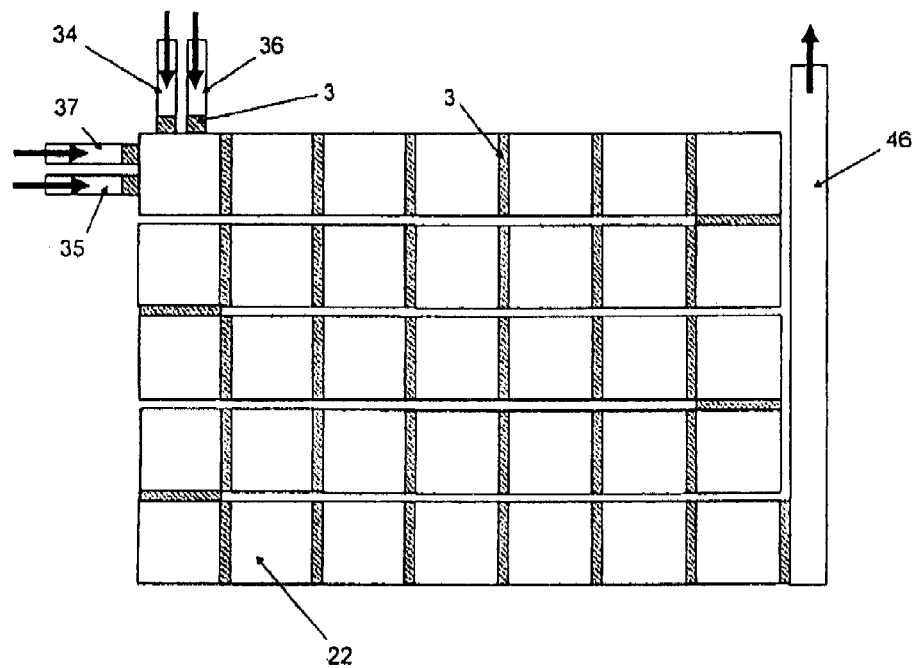
FIG. 24 is a plan view to illustrate a first embodiment of the present invention.

In the display device shown in FIG. 24, pixel 22 and switch part 3 are alternately connected in a continuous manner, and this continuous pixels 22 are meandered so as to be two-dimensionally arranged (a matrix form) thereby forming a display screen. To supply liquids of red (R), transparent (C), green (G), blue (B), four liquid supply passages 34, 35, 36, 37 are respectively connected to pixel 22 at the upper-left of the figure via switch 3. Therefore, pixel 22 at the upper-left of the figure also serves as liquid mixing element 21. Moreover, the terminal having continuous pixels (pixel at the lower-right of the figure) is connected to a liquid discharge passage 46 via switch 3. The inner walls of four liquid supply passages 34, 35, 36, 37 and liquid discharge passage 46 are preferably covered with a lyophilic surface. On the other hand, to allow the transfer operation of liquid to be speedily performed, it is preferable that the inside of pixel 22 be covered with a liquid repellent surface and pixel 22 is provided with an electrode for applying an electric field to the aforementioned liquid repellent surface, as liquid transfer means.

In the display device of this embodiment, colored ink of an arbitrary proportion is supplied to pixel 22 at the upper-left of the figure from four liquid supply passages 34, 35, 36, 37 via switch 3. The proportion of the ink to be supplied is controlled by the voltage and/or time for which switch 3 for each color is opened. Thereafter, switch 3 between adjoining pixels 22 is opened to perform transfer operation, and colored ink is transferred to a next pixel 22 thereby evacuating the contents of pixel 22 at the upper-left of the figure. And to evacuated pixel 22 at the upper-left of the figure, the ink is injected again. The above described procedure is repeated, and the switch 3 between the pixels is closed when the ink droplet is transferred up to a predetermined position. This makes it possible to obtain a stable display condition (a memory effect). When erasing a display, switch 3 connected to liquid discharge passage 46 is opened and the transfer operation of liquid drop is repeated.

As so far described, writing, storing, and erasing of a displayed image are effected.

In this embodiment, it is possible to simplify the arrangement of a plurality of ink supply passages.

Figure 25:
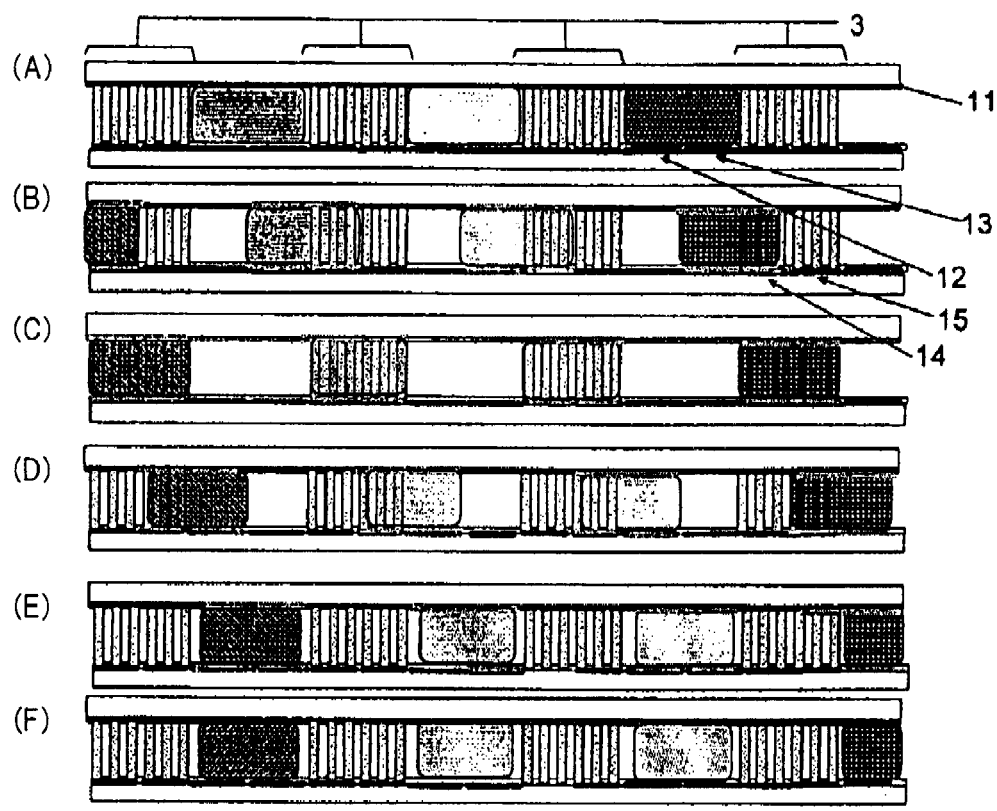
FIG. 25 is a sectional view to show an example of liquid transfer means which can be applied to the embodiment of FIG. 24.
Figure 26:
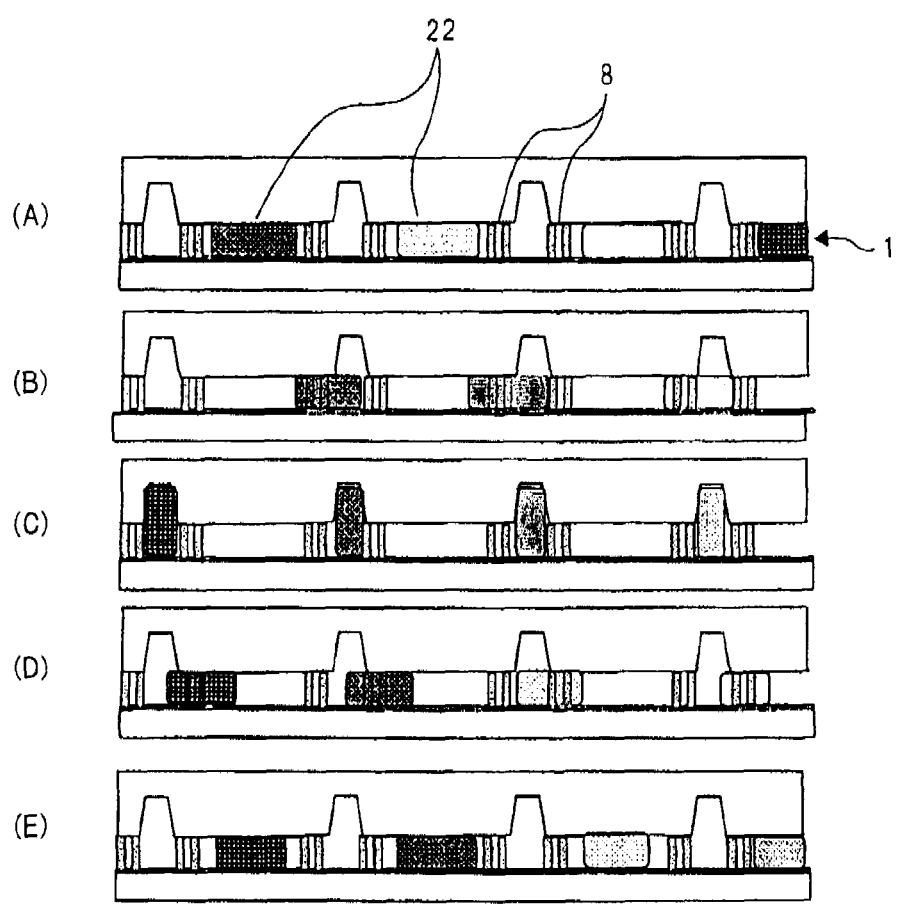
FIG. 26 is a sectional view to show a configuration example suitable for the liquid transfer route of FIG. 24.

Next, an example of the liquid transfer means used in the display device of the above described embodiment will be described by using FIGS. 25 and 26. FIGS. 25 and 26 show a flow passage cross-section including a pixel part of the display device.

In FIG. 25, common electrode 11 is provided in the substrate in the upper part of the flow passage. Further, in the substrate in the lower part of the flow passage, there are disposed switch electrode A14, switch electrode B15, flow passage electrode A12, and a flow passage electrode B13 at a cycle in this turn. A liquid repellent structure is disposed in the flow passage above switch electrode A14 and switch electrode B15 thereby constituting switch 3. In the flow passage between switches 3 shown in FIG. 25(A), there already exists a liquid droplet. Moreover, inner wall surfaces of flow passage except for switch 3 have a liquid repellency, and the liquid repellency will be reduced upon exposure to an electric field.

Supplying a voltage to flow passage electrode B13 and switch electrode A14 causes each liquid droplet to be transferred. This is the state shown in FIG. 25(B). Thereafter, voltage supply to flow passage electrode B13 is stopped, and voltage is supplied to switch electrode A14 and switch electrode B15. Since all the flow passages on flow passage electrodes A12, B13 become liquid repellent, each liquid droplet moves into switch 3 (FIG. 25(C)). Then, when the voltage supply to switch electrode A14 is stopped and when voltage is supplied to switch electrode B15 and flow passage electrode A12, each liquid droplet moves to an adjacent flow passage (FIGS. 25(D) to 25(F)).

As so far described, it becomes possible to continuously transfer liquid droplets in a stable manner without causing a state that no liquid droplet is present in a flow passage between switches 3.

Alternatively, in the present display device, the flow passage through which a liquid droplet is transferred may be configured as shown in FIG. 26. In FIG. 26, the height of flow passage 1 is partly varied. As a result of this, when a constant volume of liquid droplets is transferred, it is possible to increase the size of a shallow flow passage in the liquid flow direction (the lateral direction of the figure) and decrease the size of a deep flow passage in the flow passage direction (the lateral direction of the figure).

Second Exemplary Embodiment

A second exemplary embodiment will be described with reference to FIG. 27.

Figure 27:
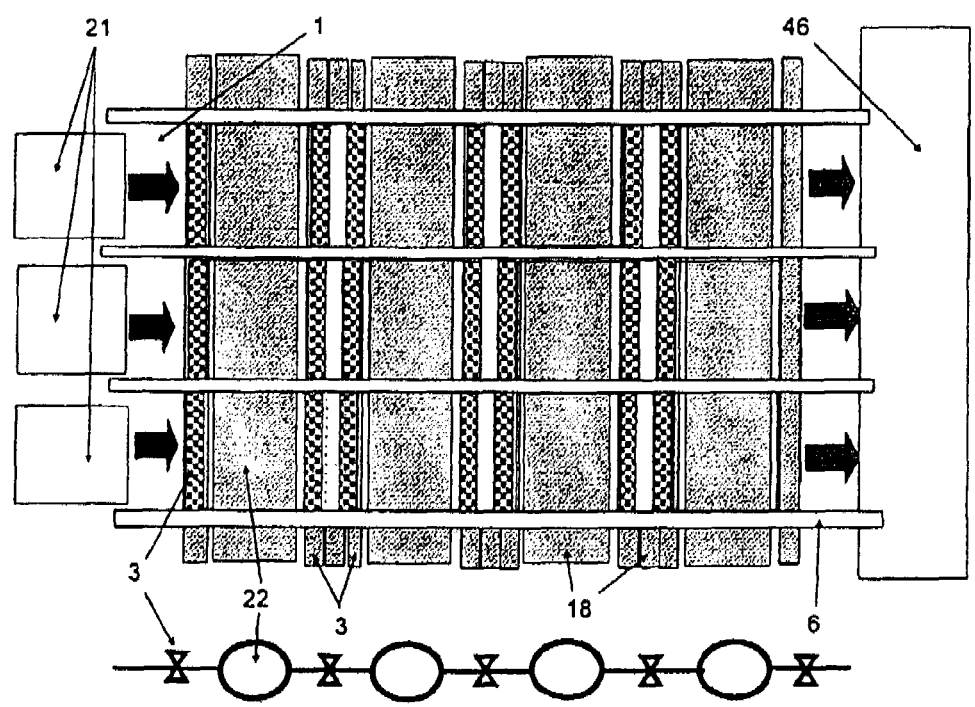
FIG. 27 is a plan view to illustrate a second embodiment of the present invention.

The display device of the configuration shown in FIG. 27 comprises liquid mixing means 21 for each pixel row. Liquid having a desired color is created by mixing a plurality of colored liquids in liquid mixing means 21 and thereafter is transferred into flow passage 1 surrounded by side walls 6. In flow passage 1, switch 3 and pixel 22 (liquid chamber) are alternately arranged. On account of this, liquid droplets of each color are transferred one by one in the right direction of flow passage 1. When a liquid droplet reaches pixel 22 at the right end, the transfer is stopped. As so far described, liquid droplets are transferred into flow passage 1 for each pixel row so that each liquid droplet reaches a predetermined pixel position thereby completing a display image.

Configuring the portion of pixel 22 in flow passage 1 to be transparent makes it possible that a surface light source is disposed in the back of a display device so as to operate as a transmission type display device. Moreover, configuring the base that corresponds to the portion of the pixel 22 of the flow passage 1 so that the base will have a white color enables the display to be operated as a reflection type display device. In either case, a pixel to which a black liquid droplet has been transferred enables display of a white image. Moreover, a pixel to which a transparent liquid droplet has been transferred can perform a white display.

When updating an image, the liquid droplet forming a display image is transferred to discharge passage 46 to erase the image. In FIG. 27, the area of pixel 22 and the area of switch 3 between pixels 22 are different. As the result of this, as shown in FIG. 26, the shallow portion of flow passage 1 is corresponded to the pixel part, and the deep portion flow passage 1 is corresponded to the switch part between pixels. As so far described, the in-plane area changes are compensated by changing the depth in the flow passage so that a constant volume of liquid droplets is transferred. As a result, in the flow passage layout shown in FIG. 26, the proportion of a pixel area in a display can be increased.

Figure 28:
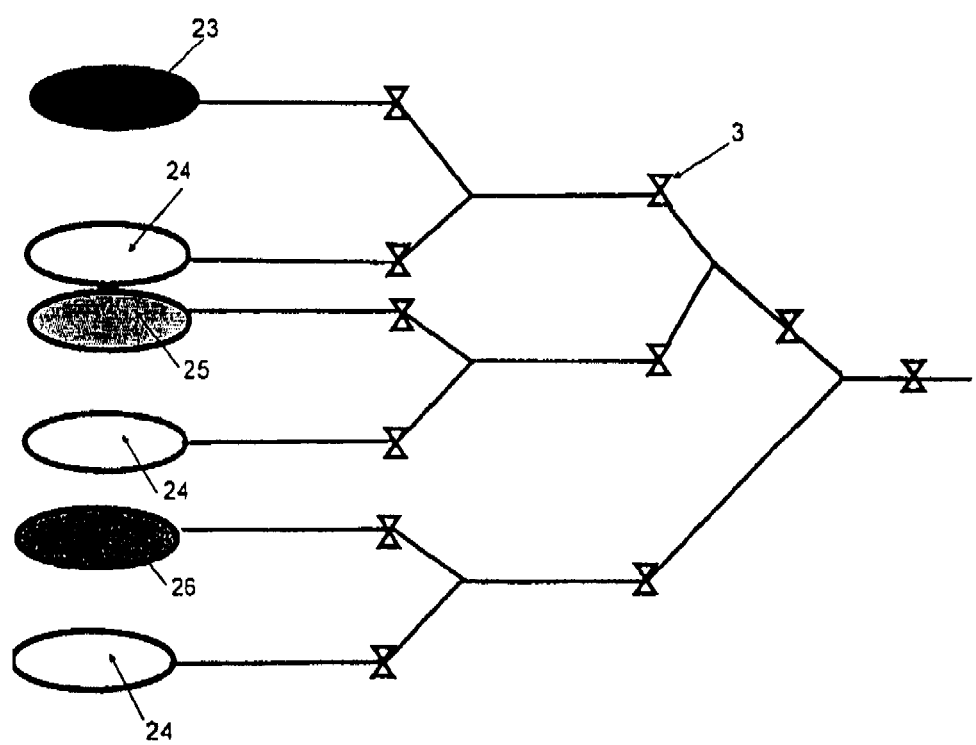
FIG. 28 is a schematic plan view to show a configuration example of the liquid droplet mixing means used in the present invention.

As illustrated in the lower part of FIG. 27, pixel 22 and switch 3 may be schematically represented using symbols. In FIG. 28, this schematic representation is used to show a configuration example of liquid mixing means 21. In FIG. 28, transparent ink tank 24 is placed in juxtaposition with each red ink tank 23, green ink tank 25, and blue ink tank 26, and red ink, green ink, and blue ink are respectively subjected to a density adjustment with transparent ink and are eventually mixed together. However, the configuration of liquid mixing means 21 is not limited to that of FIG. 28. For example, red ink, green ink, and blue ink may be mixed and adjusted in advance, thereafter being subjected to a density adjustment with transparent ink. Moreover, the ink color is not limited to the colors described above, and may be made up of red ink, green ink, blue ink, and black ink. Furthermore, yellow ink, magenta ink, and cyan ink may be mixed.

Figure 29:
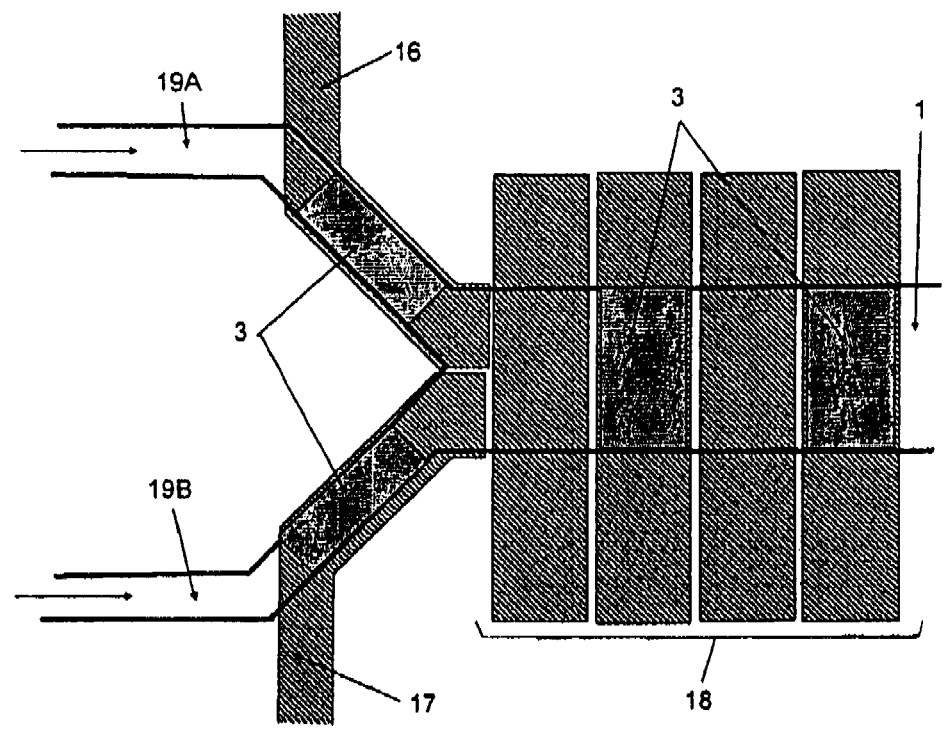
FIG. 29 is a schematic plan view to show a more specific configuration example of the liquid mixing means.

FIG. 29 shows a more detailed configuration example of liquid mixing means 21. In FIG. 29, flow passage 1 is separated into two: liquid supply passage 19A and liquid supply passage 19B, at the left end. Liquid supply passage 19A and liquid supply passage 19B are respectively connected to a liquid tank (not shown) on the upstream side. There is configured switch 3 of the above described configuration at the end connected to flow passage 1, of the liquid supply passage 19A and of the liquid supply passage 19B respectively.

To mix liquids, first, voltage is applied to mixing electrode A16 corresponding to switch 3 of liquid supply passage 19A to guide liquid A to flow passage 1. Thereafter, voltage is applied to mixing electrode B17 corresponding to switch 3 of liquid supply passage 19B to guide liquid B to flow passage 1. At this moment, by adjusting the voltage to be applied to two switches 3 and the time period during which the voltage is applied, the mixing ratio of liquid A and liquid B can be adjusted. Thereafter, liquid transfer means 18 is used to transfer the mixed liquid in the right direction of flow passage 1 in FIG. 29 following the procedure which has been described.

When mixing a larger number of liquids, it can be achieved by connecting the configuration shown in FIG. 29 in series or in parallel. For example, a liquid supply passage including a switch 3 can be newly connected to the upstream end part or the downstream end part of flow passage 1 shown in FIG. 29 to mix a large number of liquids.

As so far described, it is possible to create a liquid having an arbitrary color by using liquid mixing means 21. Generally, when a full color image is displayed, a large number of inks need to be mixed. For this purpose, a relatively complex flow passage configuration as shown in FIG. 28 becomes necessary. In the configuration of FIG. 27, since the liquid mixing means as shown in FIG. 28 is needed for each pixel row, an intersection of flow passages (liquid supply passages) may occur.

Figure 30:
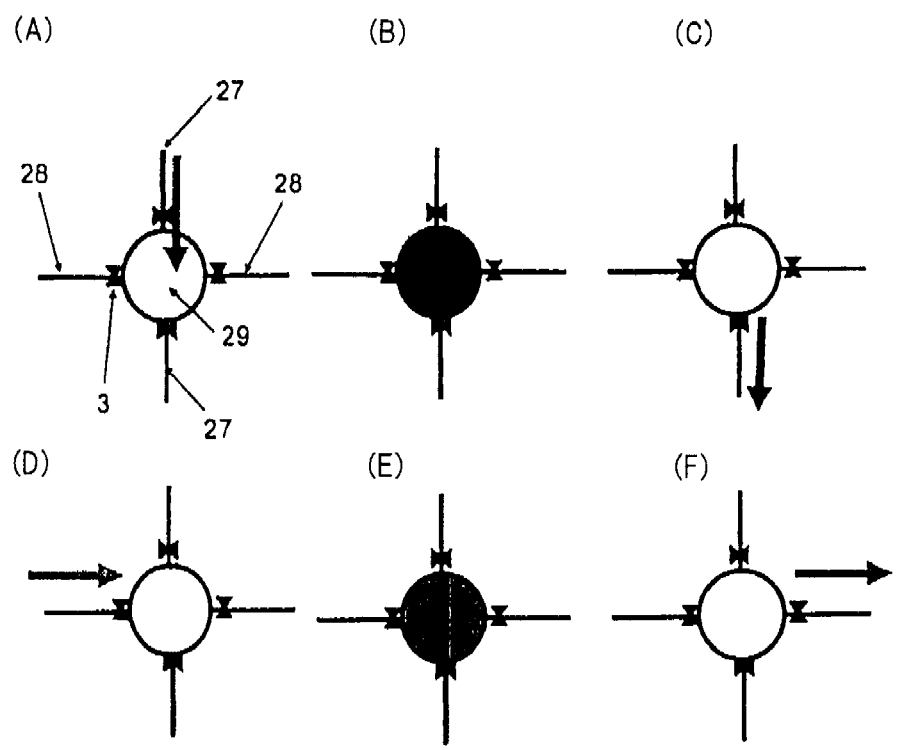
FIG. 30 illustrates the operation of the liquid mixing element used in the second embodiment of the present invention, for a case in which flow passages intersect.

However, even in intersected flow passages, by disposing switch 3 and making it operate properly, it is possible to handle liquids without mixing them with each other. This configuration is shown in FIG. 30. FIG. 30 shows a case in which liquid A is transferred through flow passage 27 extending in the vertical direction of the figure, and liquid B is transferred through flow passage 28 extending in the horizontal direction of the figure. First, liquid A is transferred from flow passage 27 in the upward direction to central flow passage 29 (FIGS. 30(A) and 30(B)). Next, liquid A is transferred to flow passage 27 in the downward direction thereby evacuating central flow passage 29 (FIG. 30(C)). Thereafter, liquid B is transferred from flow passage 28 in the left direction to central flow passage 29 (FIGS. 30 (D) and 30(E)). Thereafter, liquid B is transferred from central flow passage 29 to flow passage 28 on the right (FIG. 30(F)). In this way, it is possible to handle two kinds of liquid droplets independently by means of switch part 3 and the drive timing without the need of constructing three-dimensionally intersecting flow passages.

Third Exemplary Embodiment

Figure 31:
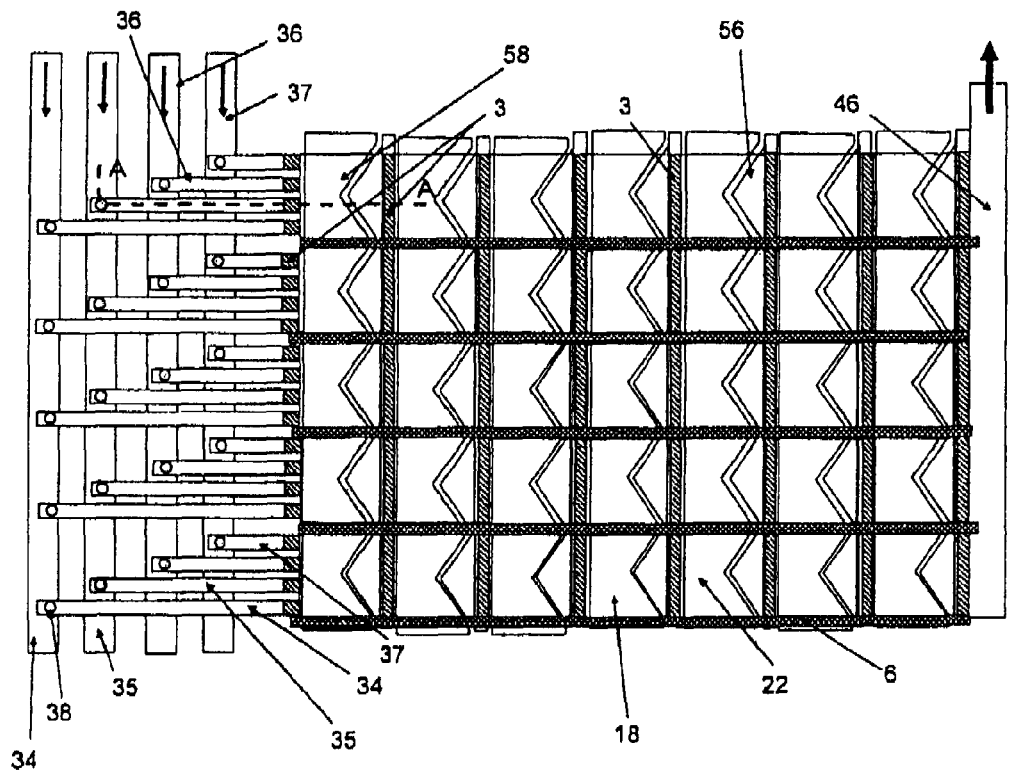
FIG. 31 is a plan view to illustrate a third embodiment of the present invention.

Next, a third exemplary embodiment will be described based on FIGS. 31 and 32. FIG. 31 is a plan view to show the display device of the present embodiment, and FIG. 32 is a sectional view taken along A-A' in FIG. 31.

In the embodiment shown in FIG. 31, a flow passage structure, in which pixel 22 and switch 3 are alternately connected, is disposed linearly in a row direction (the lateral direction of the figure), and a plurality of flow passage structures are disposed in a column direction (the longitudinal direction of the figure) with side wall 6 therebetween so that a matrix form display screen is formed with a plurality of pixels 22.

Figure 32:
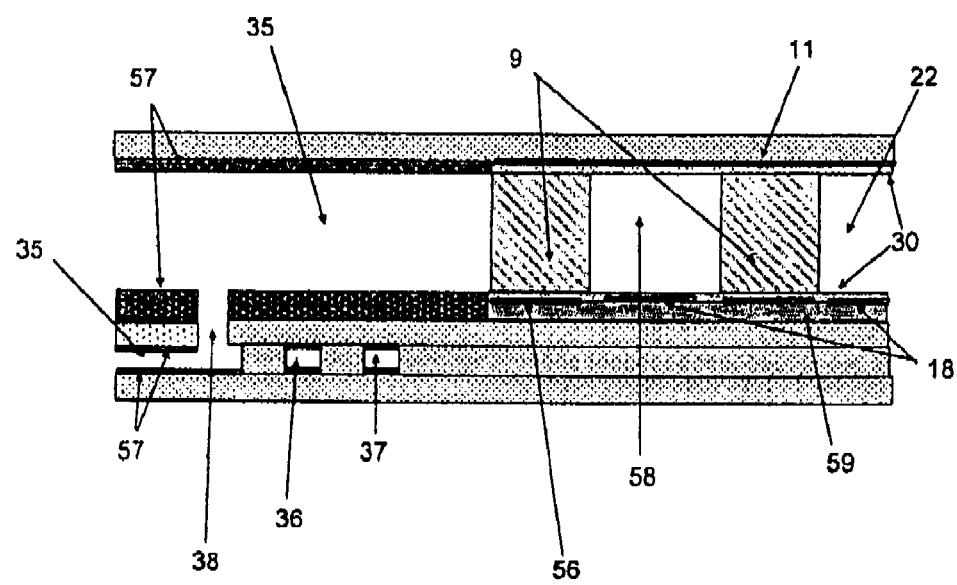
FIG. 32 is a sectional view taken along A-A' of FIG. 31.

As seen from FIG. 32, in the present embodiment, generally three substrates are stacked to form an upper layer and a lower layer flow passage. For the lower layer flow passage, four liquid supply passages 34, 35, 36, 37 for red (R), clear (C), green (G) and blue (B) fluids are disposed on one side in the row direction (the left side of the figure) of the display part in the lower layer. The liquid supply passages for each color are connected to each of the corresponding liquid supply passages 34, 35, 36, 37 of the upper layer via liquid hole 38. In the present embodiment, ink droplets are transferred in the rows of the displaying portion from the left to the right of the figure. Therefore, pixel 22 at the left end of each row is connected to four liquid supply passages 34, 35, 36, 37 of the upper layer. Further, a switch 3 is provided at the inject portion to a pixel 22, of each liquid supply passage 34, 35, 36, 37 of the upper layer. Further, pixel 22 at the left end of each row also serves as liquid mixing means 58 for mixing liquids by liquid injection into the aforementioned pixel.

When performing the writing of an image, switch 3 of each liquid supply passage of the upper layer is opened, and inks of each color are injected from each liquid supply passage to liquid mixing element 58 at the left end. By varying the injection proportion of each ink, any color can be adjusted in liquid mixing means 58. Thereafter, ink is transferred from liquid mixing means 58 at the left end to adjacent pixel 22 on the right. At this moment, the shape of the electrode of switch electrode 56 disposed in correspondence with switch 3 is configured to be a so-called chevron pattern. A chevron pattern is a shape in which the side-edge of switch electrode 56 corresponding to the electrode side of liquid transfer means 18 is angle-shaped and the electrode side-edge, which is opposite to the aforementioned side-edge, of liquid transfer means 18 is valley-shaped. As describe later, this geometry makes it possible to transfer ink droplets more stably. By repeating the above described ink transfer and ink injection into liquid mixing means 58 at the left end, it is possible to obtain a display image as with the first embodiment. Moreover, the present embodiment shows a case in which porous material 9 is used as the liquid repellent structure constituting switch 3 as shown in FIG. 32.

In this embodiment, although the arrangement of the ink supply passage becomes complicated compared with the first embodiment, the distance of liquid droplet transfer between pixels can be reduced. Because of this, it becomes possible for display Images to be more rapidly updated.

Here, the effect of the above described chevron pattern electrode structure will be described by use of FIGS. 33 and 34.

Figure 33:
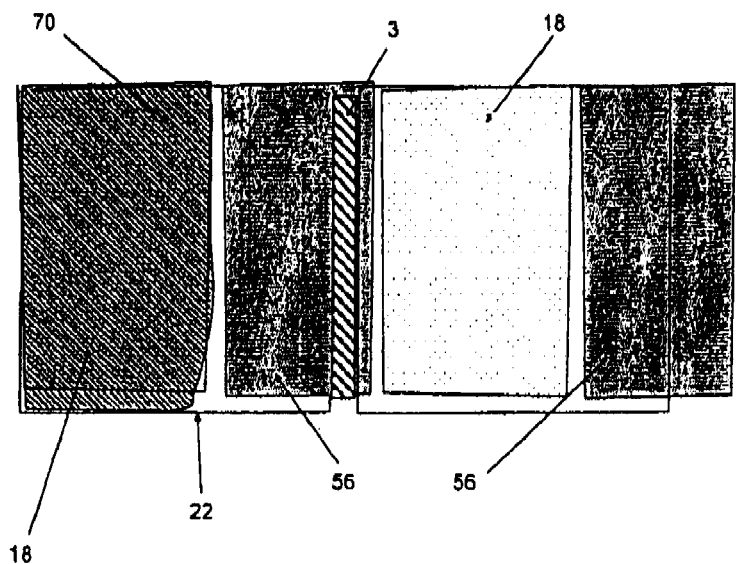
FIG. 33 illustrates an electrode layout used in the display device of the third embodiment.

FIG. 33 shows a liquid droplet shape when the layout of the electrode of liquid transfer means 18 and switch electrode 56 does not have a chevron pattern. When voltage is applied to the electrode of liquid transfer means 18, liquid droplet 70 is positioned on the electrode of liquid transfer means 18 (state of FIG. 33). On the other hand, on switch electrode 56 to which voltage is not applied, liquid droplet 70 tries to avoid this region due to liquid repellency. When the ink droplets are in short supply, the distance between an ink droplets and next switch electrode 56 increases. In this case, even if voltage that is applied to the electrode of liquid transfer means 18, where the liquid droplet is positioned, is deactivated, and voltage is applied to next switch electrode 56, a stable liquid droplet transfer cannot be expected.

Figure 34:
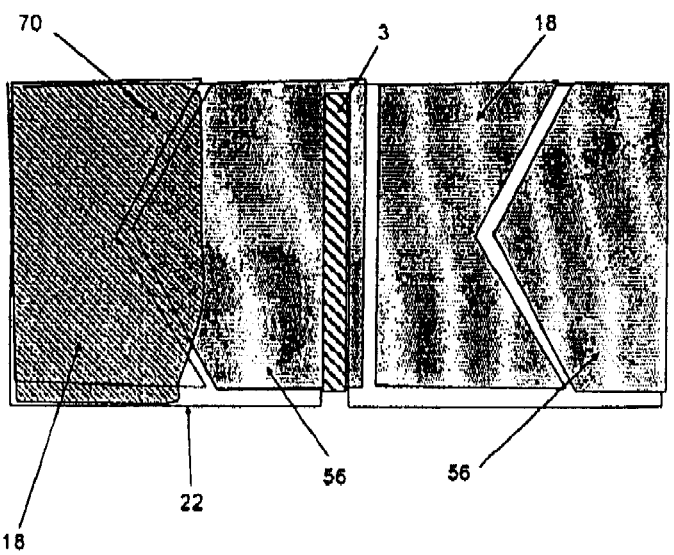
FIG. 34 illustrates an electrode layout used in the display device of the third embodiment.

On the other hand, in the case of a chevron pattern as shown in FIG. 34, a part of liquid droplet 70 is superimposed on switch electrode 56 without exception even when the amount of liquid droplet in pixel 22 is small. This is caused by the fact that the shape of the liquid (meniscus) cannot be an acute shape. Therefore, in the case of a chevron pattern electrode structure, the tip of the angle-shaped side-edge of switch electrode 56 can work as the starting point to start the transfer of a liquid droplet.

Fourth Exemplary Embodiment

Based on FIGS. 35 and 36, a fourth exemplary embodiment will be described. As shown in FIG. 36, the display device of the present embodiment is generally made up of upper layer substrate 62, middle layer substrate 61, and lower layer substrate 60. Between respective substrates, a flow passage is formed and a flow passage formed between upper layer substrate 62 and middle layer substrate 61 is called an "upper layer flow passage." Moreover, a flow passage formed between middle layer substrate 61 and the lower layer substrate 60 is called a "lower layer flow passage."

Figure 35:
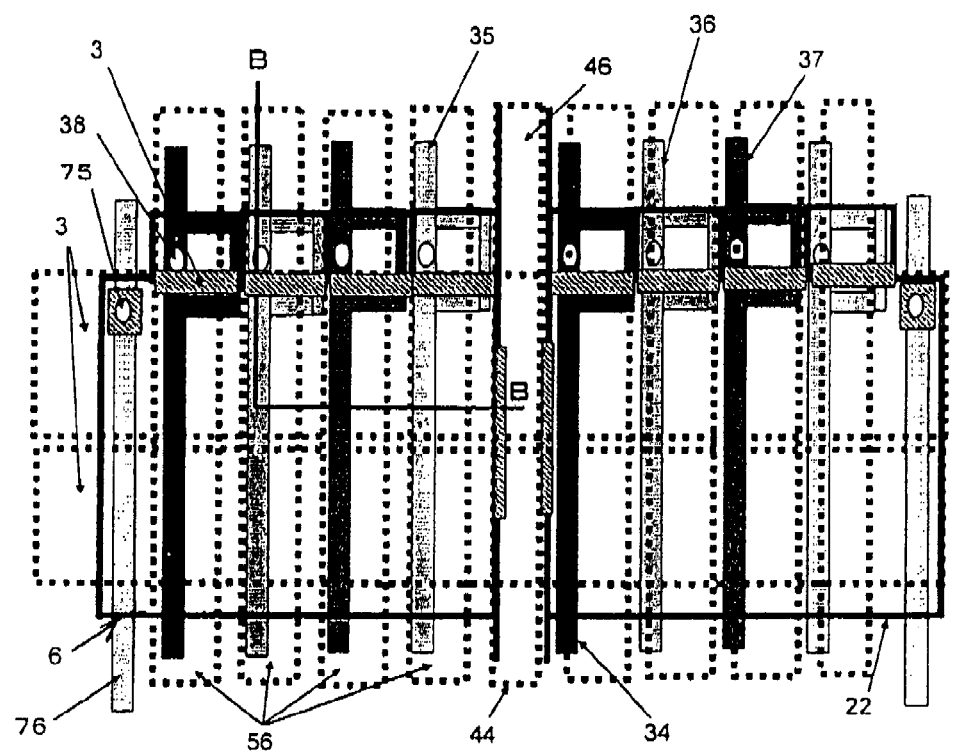
FIG. 35 is a plan view to illustrate a fourth embodiment of the present invention.
Figure 36:
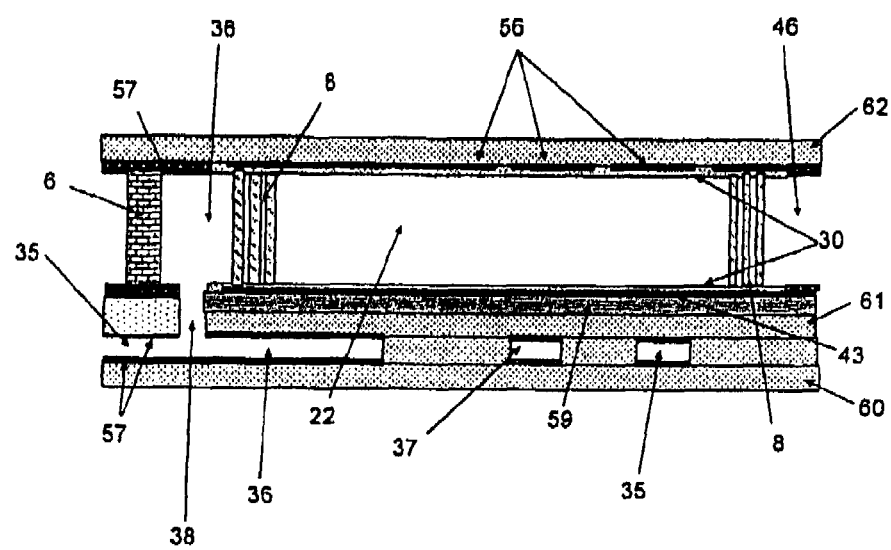
FIG. 36 is a sectional view taken along B-B' of FIG. 35.

FIG. 35 shows in a perspective view the layout of the upper layer flow passage and the lower layer flow passage. As seen from FIG. 35, as the lower layer flow passage, liquid supply passage R34 for supplying red (R) ink, liquid supply passage G36 for supplying green (G) ink, liquid supply passage B37 for supplying blue (B) ink, and liquid supply passage C35 for supplying transparent (C) ink extend in the vertical direction of the figure. And, liquid supply passages 34, 36, 37, 35 are disposed in this turn, in a cycle in the lateral direction of the figure.

Further, each liquid supply passage of the lower layer is linked with the upper layer flow passage (the portion surrounded by a solid line in FIG. 35) via liquid hole 38. The upper layer flow passage is made up of: four kinds of regions in which liquid hole 38 formed for a liquid supply passage of each color is surrounded by switch 3 and side wall 6; a region (liquid chamber) to form pixel 22; and liquid discharge passage 46 which is linked with the pixel 22 via the switch 3. Each switch 8 is a region in which liquid repellent pillars 8 are disposed.

Four switches 3 disposed in the vicinity of each liquid hole 38 independently select whether or not liquids of red (R), green (G), blue (B), and transparent (C) are allowed to flow into pixel 22. For this purpose, upper layer substrate 62 has four switch electrodes 56 that correspond to with switches 3 for each color, and there is provided on middle layer substrate 61 scanning electrode 43. Each switch electrode 56 is disposed along each liquid supply passage of the lower layer. Scanning electrode 43 is disposed in the lateral direction of the figure so as to intersect with switch electrodes 56.

Voltage is applied between these switch electrodes 56 and scanning electrodes 43 so that inks of red (R), green (G), blue (B), and transparent (C) liquids are injected into pixel 22 from liquid hole 38 for each color. The injection ratio of these liquids can be controlled by the voltage and the time period at and for which the switch 3 for each color is opened. Moreover, pixels 22 are arranged in a matrix form and a desired colored ink is injected into each pixel 22 so that a full color image can be displayed.

Dividing the scanning electrode 43 as shown in FIG. 35 makes it possible to apply voltage within pixel 22 immediately after the injecting of ink which causes ink to move in pixel 22, thereby mixing the inks.

When erasing an image, voltage is applied to between scanning electrode 43 and discharge electrode 44 disposed along liquid discharge passage 46 to open switch 3 of liquid discharge passage 46 thereby discharging the ink in pixel 22. Upon discharge, a similar operation as the one described using FIG. 22 is performed to move the ink in the pixel 22 toward liquid discharge passage 46 so that the discharge operation can be speedily performed.

To perform the discharge operation more speedily, vent pipe 76 as shown in FIG. 35 is further provided in the lower layer where each liquid supply passage is formed. Vent pipe 76 is connected to the upper layer flow passage including a region of the pixel 22 via vent hole 75. This connection part to the upper layer flow passage is configured to be on the opposite side of liquid discharge passage 46. Moreover, the periphery of vent hole 75 is surrounded by switch 3. On account of this, liquid cannot enter vent hole 75. When a discharge operation is performed, the liquid in pixel 22 is moved toward liquid discharge passage 46. Therefore, it is necessary to refill the region where there originally exists a liquid with a gas such as air. Accordingly, by disposing vent hole 75 in a distal position with respect to liquid discharge passage 46, the pixel 22, it becomes possible to more speedily perform a discharge operation.

Further, a method of producing the structure shown in FIG. 36 will be described using FIGS. 37, 38, 39 and 40. As seen from FIG. 36, this structure is made up of lower layer substrate 60, middle layer substrate 61, and upper layer substrate 62. Then, methods of producing each substrate will be described by using FIGS. 37, 38, 39 in sequence.

Figure 37:
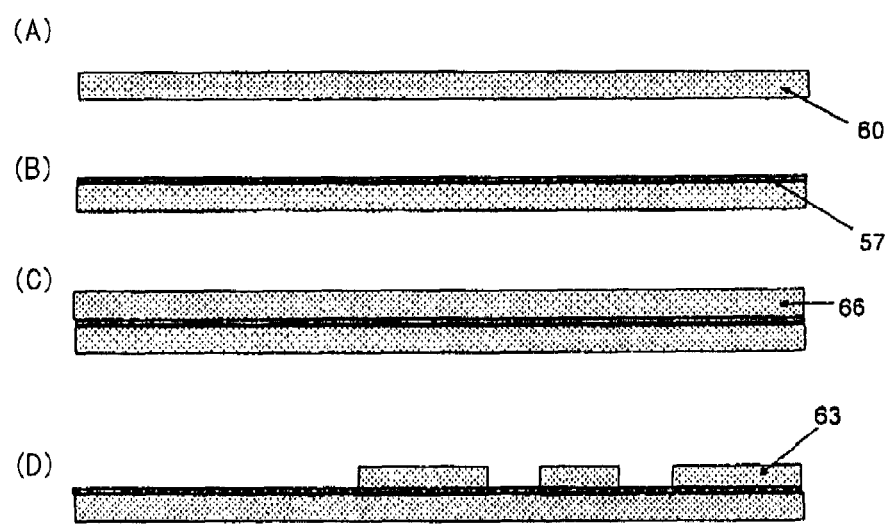
FIG. 37 is a process chart to illustrate the production method of an upper layer substrate constituting the display device of the fourth embodiment.

As shown in FIG. 37, lower layer substrate 60 is provided and the surface thereof is formed into lyophilic surface 57. This can also be realized by forming a lyophilic thin film on the lower layer substrate surface. Alternatively, it is possible to form such a surface by modifying the surface of the lower layer substrate. Thereafter, transparent side wall 63 is formed on the lower layer substrate surface. This is obtained, as shown in FIG. 38(C), by forming a coating film of photosensitive resin 66 on the lower layer substrate surface and processing this coating film by a photolithography process. Alternatively, transparent side wall 63 may be directly patterned on to the lower layer substrate surface by a printing method.

Figure 38:
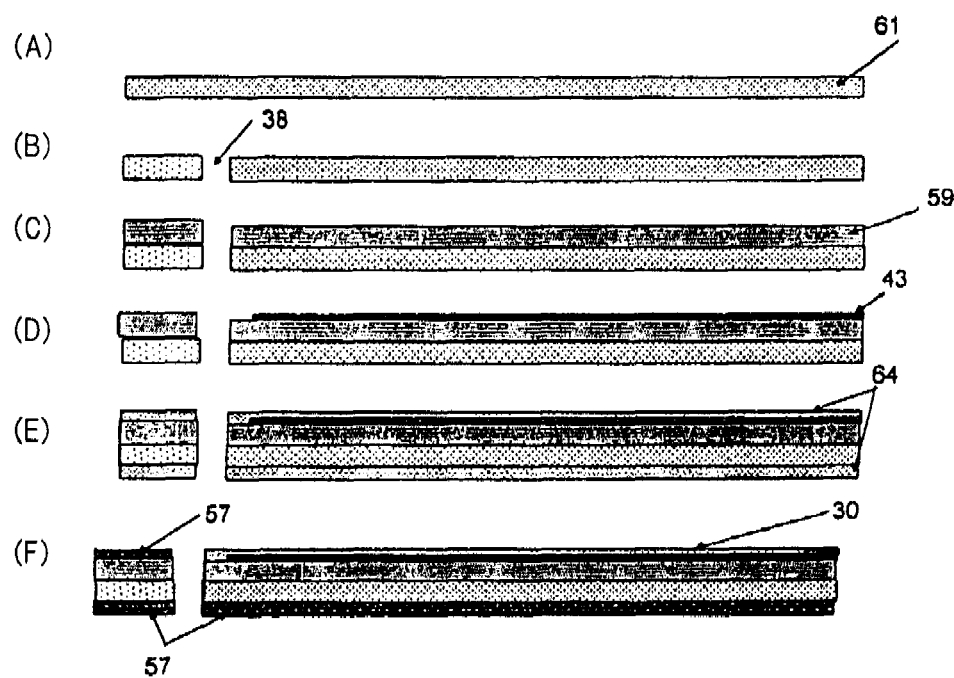
FIG. 38 is a process chart to illustrate the production method of a middle layer substrate constituting the display device of the fourth embodiment.

Middle layer substrate 61 is processed as shown in FIG. 38. First, liquid holes 38 are opened through middle layer substrate 61. This may also be carried out by molding plastic resin. Alternatively, it is possible to form a hole in the substrate by using a mechanical drill. Alternatively, it is also possible to form a hole by chemically etching the substrate. Alternatively, photosensitive glass may be used to fabricate a drilled substrate. Next, when a reflection display is intended, white reflector 59 is formed on middle layer substrate 61. For this white reflector, a metallic layer having a rough surface may be used. Alternatively, a resin film having a scattering property may be used. Alternatively, a white paint layer may be used. Next, a transparent conductive layer is formed on white reflector 59 and is patterned to obtain scanning electrode 43. Next, liquid repellent thin film 64 is formed on the substrate surface. Liquid repellent thin film 64 can be formed by, for example, such a technique as dip coating. In this case, liquid repellent thin film 64 is formed in the front face and back face of the substrate as shown in FIG. 38(E). Thereafter, liquid repellent thin film 64 of the back face of the substrate, which provides inner wall of the lower layer flow passage (liquid supply passage), is lyophilized (FIG. 38(F)). That is, the back face of the substrate is modified into lyophilic surface 57. This can be realized by ultraviolet irradiation. Alternatively, it can be realized by exposing the back face of the substrate into plasma. Thereafter, a part of the front face of the substrate is lyophilized to modify it into a lyophilic surface 57 (FIG. 38(F)). This can be realized by performing a lyophilization treatment as described above using an appropriate mask.

When the liquid to be used is a hydrophilic liquid, a lipophilic substance or fluorine based substance may be used as liquid repellent thin film 64. In this case, the lipophilic substance or fluorine based substance can be hydrophilized by ultraviolet treatment in oxygen or by plasma treatment in oxygen.

Further, when the liquid to be used is a lipophilic liquid, a fluorine based substance may be used as liquid repellent thin film 64. In this case as well, lipophilization can be performed by ultraviolet irradiation or by plasma treatment under an appropriate atmosphere. Alternatively, the thin film surface can be modified with hydrocarbon to be lipophilized by means of a surface treatment agent after the above described hydrophilization treatment has been completed.

FIG. 38(E) shows a case in which liquid repellent thin film 64 is formed simultaneously on both surfaces of the substrate. However, it is also possible to form liquid repellent thin film 64 only on the substrate front face and after lyophilizing a part of this liquid repellent thin film 64, to form a lyophilic thin film only on the substrate back face. In this case, there is no need to do a surface modification with respect to the substrate back face.

Figure 39:
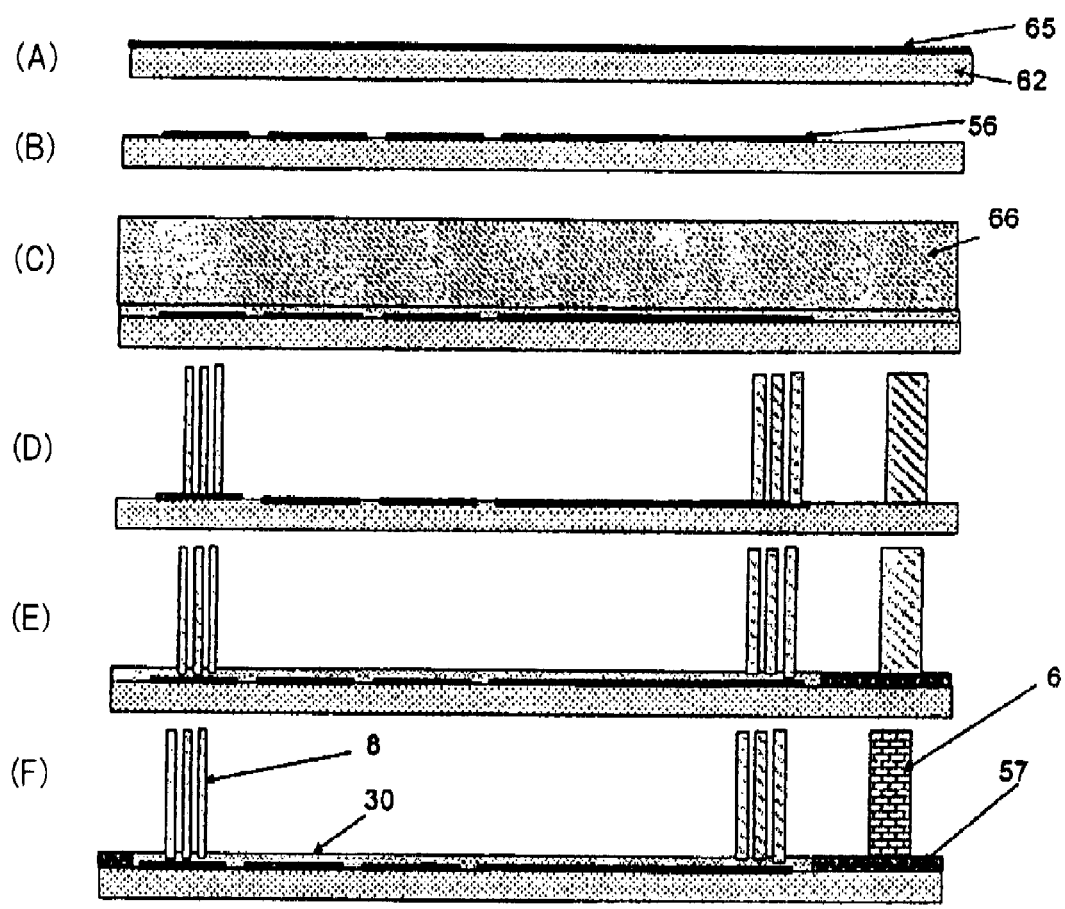
FIG. 39 is a process chart to illustrate the production method of a lower layer substrate constituting the display device of the fourth embodiment.

Further, a method of producing upper layer substrate 62 will be described by using FIG. 39. First, transparent conductive layer 65 is formed on upper layer substrate 62 and is patterned to form switch electrode 56. Thereafter, a coating of photosensitive resin 66 is formed on the entire surface where switch electrode 56 is formed. Then, the coating is patterned by a photolithography process to form a pillar structure of the switch part and side walls 6 of the flow passage. Thereafter, liquid repellency treatment is performed on the pillar structure surface and the substrate front face. This may be achieved simply by coating the liquid repellent thin film. Alternatively, to obtain liquid repellent surface 30, a surface modification may be performed by exposing it to plasma. Thereafter, liquid repellent surface 30 is partly subjected to lyophilization. The liquid repellency of pillar 8 positioned at switch 3 is maintained. Moreover, side wall 6 is treated either on the liquid repellent surface or on the lyophilic surface depending on the location to be disposed.

Figure 40:
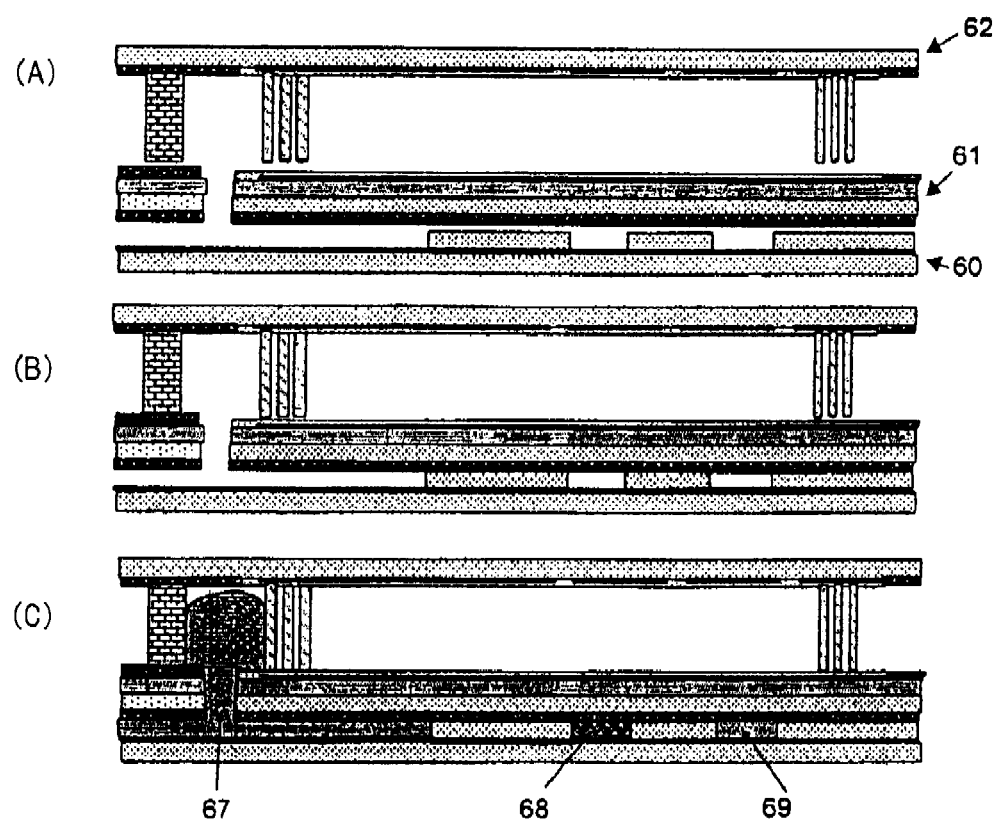
FIG. 40 is a process chart to illustrate the production method of the display device of the fourth embodiment.

Three substrates which have been provided through the above described processes are laminated together as shown in FIG. 40. Thereafter, as shown in FIG. 40(B), the positions thereof with respect to each other are adjusted to join three substrates together. This joining can be performed, for example, by interposing an adhesive material between the lyophilic regions of the substrate to be joined. Alternatively, when a fluorine based substance is used for the liquid repellent region, since secure bonding cannot be expected, joining is performed only at the lyophilic regions. Regarding liquid repellent pillar 8, according to the principle of liquid repellants, it is not necessary to interpose an adhesive at the part where liquid repellent pillar 8 and middle layer substrate 61 are jointed. After joining three substrates as describe above, each colored ink is filled into the predetermined lower layer flow passage; this is shown in FIG. 40(C).

Fifth Exemplary Embodiment

Based on FIGS. 41, 42, 43, 44 and 45, a fifth exemplary embodiment will be described. The present embodiment differs from the embodiments described so far in that the number of the opening part in the flow direction of the switch part is one or two.

Figure 41:
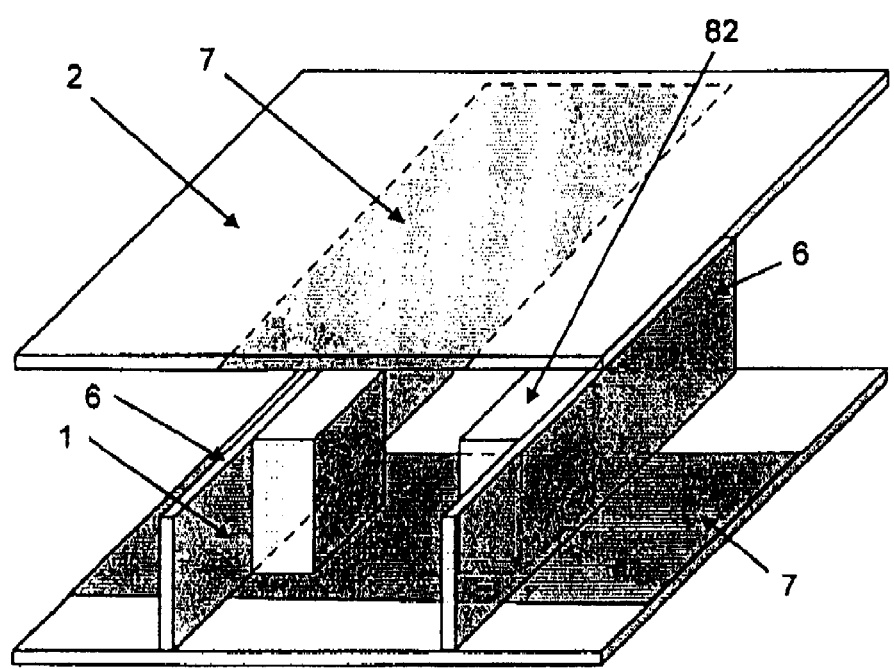
FIG. 41 is a schematic perspective view to show a configuration example of a switch provided in the display device of a fifth embodiment.

An example is shown in FIG. 41. In FIG. 41, there is formed flow passage 1 surrounded by a pair of side walls 6 between two substrates 2. In flow passage 1, a switch is constructed by connecting liquid repellent wall 82 to the inner face of each side wall 6. Therefore, the number of the opening part in the flow direction is one in this switch part.

Figure 42:
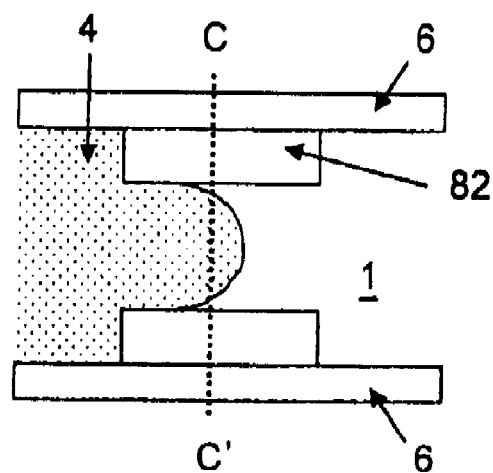
FIG. 42 is a schematic front view to illustrate the meniscus when liquid passes through the switch of FIG. 40.
Figure 43:
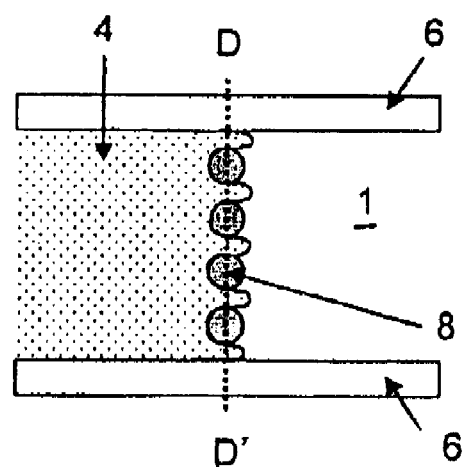
FIG. 43 is a schematic front view to illustrate the meniscus when liquid passes through the switch of FIG. 11.

As shown in FIG. 42, when flow passage 1 is viewed from a direction perpendicular to substrate 2, liquid 4 continues to remain as a mass of liquid at C-C' section of FIG. 42 when liquid 4 passes through the switch of the liquid repellent wall 82. On the other hand, as shown in FIG. 43, when liquid 4 passes through the switch of FIG. 11, liquid 4 is divided into five parts at section D-D'.

Figure 44:
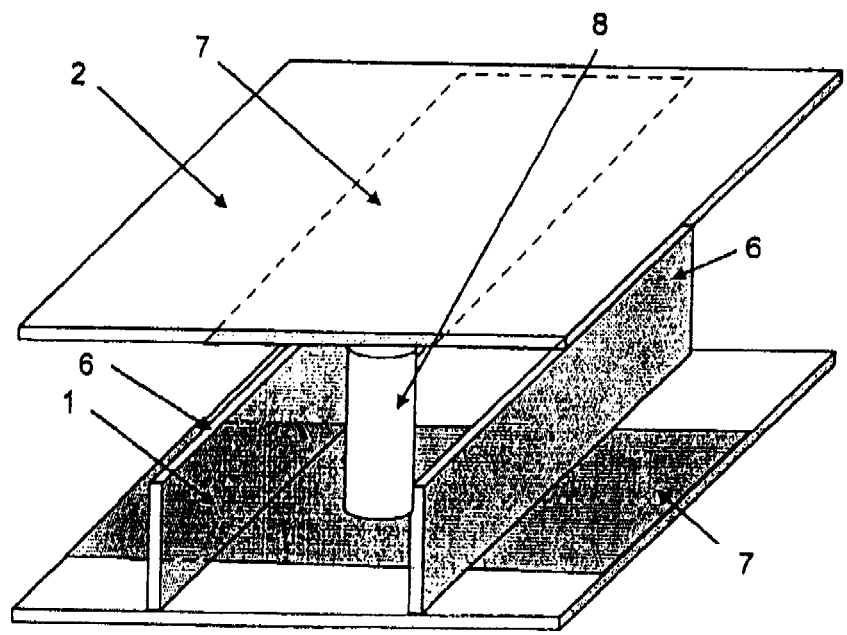
FIG. 44 is a schematic perspective view to show a configuration example of a switch provided in the display device of the fifth embodiment.
Figure 45:
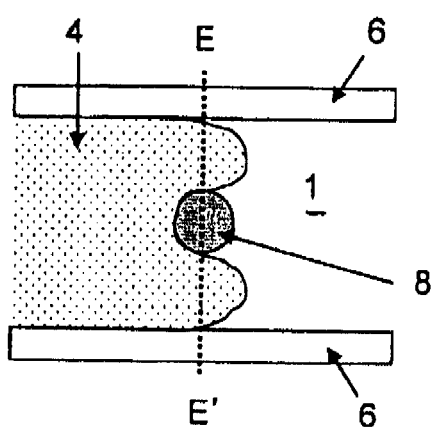
FIG. 45 is a schematic front view to illustrate the meniscus when liquid passes through the switch of FIG. 44.

Another example is shown in FIG. 44. In FIG. 44, a switch is constructed in flow passage 1 by installing one liquid repellent pillar 8. Therefore, the number of the opening part in the flow direction is two in this switch part. Moreover, as seen from FIG. 45, when liquid 4 passes through the switch of FIG. 44, liquid 4 divides into two parts at section E-E'.

When liquid 4 passes through a large number of opening parts, a complicated meniscus will be formed along the shape thereof. On the other hand, when the opening part is at one or two locations, the meniscus may be simple compared with a case in which there is a large number of opening parts. Since forming a complicated meniscus will require energy, it becomes easier for the liquid to pass through the switch when the number of the opening parts is small, compared with a case in which there is a large number of opening parts. Therefore, it becomes possible to reduce the voltage that is applied for adjusting the liquid repellency and to improve the moving speed of liquid and therefore the display speed.

Sixth Exemplary Embodiment

Based on FIGS. 46 and 47, a sixth exemplary embodiment will be described. What differs from the embodiments described so far is the means for applying the electric field to the liquid repellent surface.

In the embodiments described so far, the means for applying the electric field to a liquid repellent surface is configured such that electrode 7 is provided in both of two substrates 2 as shown in FIG. 11, and voltage is applied to both electrodes 7 so as to apply an electric field to the liquid repellent surface. This method is referred to as a vertical electric field scheme. On the other hand, in the present embodiment, as shown in FIG. 46, one of the two opposing substrates 2 has mutually meshing comb-teeth electrodes 7A, 7B, and an electric field is applied by applying voltage between combination comb-teeth electrodes 7A, 7B. This method is referred to as a lateral electric field scheme. A plan view of comb-teeth electrodes 7A, 7B is shown in FIG. 47. In FIG. 47, a voltage is applied between combination comb-teeth electrodes 7A, 7B so that an electric field is created in direction 83 which is parallel with the substrate surface of two substrates 2 and is perpendicular to the direction in which the comb teeth of comb-teeth electrodes 7A, 7B extend. Thus, an electric field is created in the direction parallel with the display surface. The strength of this electric field is inversely proportional to electrode spacing 82 between comb-teeth electrodes 7A, 7B.

In a vertical electric field scheme, when the spacing between substrates 2 is decreased and the spacing between electrodes 7 is decreased in order to increase the strength of the electric field, flow passage 1 becomes shallow. When flow passage 1 has become shallow, to display the same color as before it became shallow, the optical density of the colored ink needs to be increased. However, it is difficult to increase the optical density without changing the property of the liquid of the colored ink. On the other hand, to increase the strength of an electric field in a lateral electric field scheme, electrode spacing 82 may be decreased since the strength of an electric field is inversely proportional to comb-teeth electrode spacing 82. Therefore, since a lateral electric field scheme allows the electrode spacing to be reduced more easily compared with a vertical electric field scheme, it becomes possible to reduce the voltage that is applied for liquid repellency control.

Figure 46:
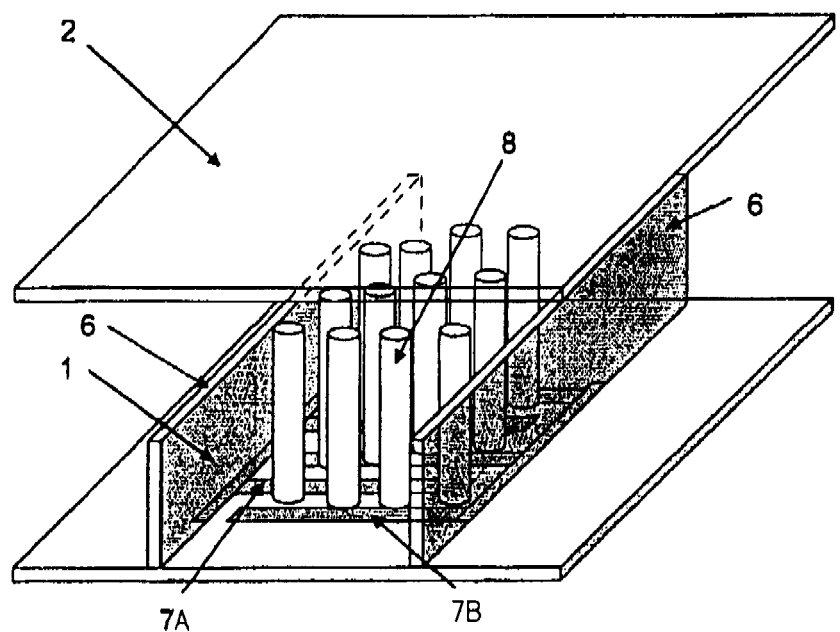
FIG. 46 is a schematic perspective view to show an configuration example of a switch provided in the display device of a sixth embodiment.
Figure 47:
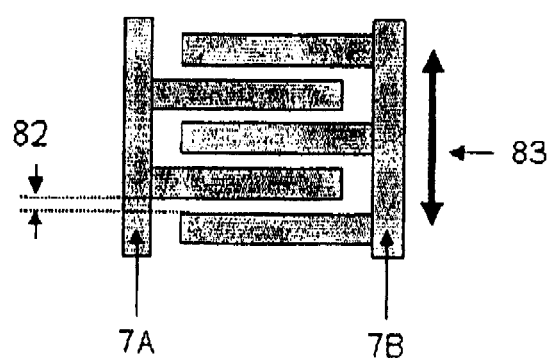
FIG. 47 is a schematic front view to illustrate the geometry of a comb-teeth electrode.

Moreover, in FIG. 46, although the flow direction of liquid and electric field direction 83 based on comb-teeth electrodes 7A, 7B are configured to be parallel, it may not be so. Moreover in the present embodiment, although an example is shown in which comb-teeth electrodes 7A, 7B are used as the means for applying the electric field to the switch part composed of liquid repellent pillar 8, such comb-teeth electrode may also be used for applying an electric field to a liquid repellent surface other than the switch part.

According to the present invention which has been described so far by way of embodiments, liquid droplets which serve as pixels are prevented from being mixed with each other when liquid droplets are transferred in order to display an image, thus enabling a stable liquid transfer. Since the switch can cause liquid to remain in a pixel, it becomes possible to impart a memory effect to the display state.

While preferred embodiments of the present invention have been described using specific terms, such description is for illustrative purposes only, and it is to be understood that changes and variations may be made without departing from the spirit or scope of the following claims.

What is claimed is:

1. A display device comprising:
   a pixel made up of a liquid chamber which can contain liquid;
   a switch to control the passage and blockage of liquid;
   a liquid supply passage and a liquid discharge passage which are connected to said pixel via said switch; and
   liquid transfer means for transferring liquid from said liquid supply passage into said pixel and for transferring liquid from said pixel to said liquid discharge passage, wherein
   a plurality of said pixels are connected in series such that said liquid discharge passage serves as said liquid supply passage, and
   liquid mixing means for mixing a plurality of liquids are connected to the pixel at the uppermost stream of said series connected pixels.

2. An electronic instrument comprising the display device according to claim 1.

3. The display device according to claim 1, wherein said switch includes a structure which is physically opened in a flow direction that liquid moves and which has a liquid repellent surface, and the liquid repellency of said structure is adjusted by the presence or absence of the voltage applied to said structure so that the passage and blockage of liquid is controlled.

4. The display device according to claim 3, wherein an opening part of said switch is formed by a part of said structure which is physically opened, the opening part is opened in one place in said flow direction.

5. The display device according to claim 3, wherein an opening part of said switch is formed by a part of said structure which is physically opened, the opening part is opened in two places in said flow direction.

6. The display device according to claim 3, wherein said liquid transfer means is made up of electric field applying means which selectively applies an electric field to the liquid repellent surface of the structure constituting said switch and to the liquid repellent surface covering the inner wall of said pixel.

7. The display device according to claim 6, wherein said electric field applying means is a comb-teeth electrode which can generate an electric field in a direction parallel with a display surface.

8. The display device according to claim 3, wherein when a liquid, in which a charged particle is dispersed, is used, said liquid transfer means is made up of electric field applying means which selectively applies an electric field to the liquid repellent surface of the structure constituting said switch and to the flow passage part except for said switch.

9. The display device according to claim 8, wherein said electric field applying means is a comb-teeth electrode which can generate an electric field in a direction parallel with a display surface.

10. A display device comprising:
    a pixel made up of a liquid chamber which can contain liquid;
    a switch to control the passage and blockage of liquid;
    a liquid supply passage and a liquid discharge passage which are connected to said pixel via said switch; and
    liquid transfer means for transferring liquid from said liquid supply passage into said pixel and for transferring liquid from said pixel to said liquid discharge passage, wherein
    a plurality of said pixels are arranged in a matrix form; said liquid supply passage connected to each of said pixels is a liquid supply passage branched off from a liquid supply source; and said liquid discharge passage connected to each of said pixels is connected to one liquid discharge tank.

11. The display device according to claim 10, wherein said device further comprises a plurality of said liquid supply sources, and
    a plurality of said liquid supply passages that are branched off from each of said plurality of liquid supply sources are connected to each of said pixels.

12. The display device according to claim 10, wherein said liquid supply passage is disposed in the lower layer of the region in which said pixel is disposed, and said device comprises a matrix electrode for multiplex-driving each of said switches positioned between said each liquid supply passage and said each pixel.

13. An electronic instrument comprising the display device according to claim 10.

14. The display device according to claim 10, wherein said switch is made up of a structure which is physically opened in a flow direction that liquid moves and which has a liquid repellent surface, and the liquid repellency of said structure is adjusted by the presence or absence of the voltage applied to said structure so that the passage and blockage of liquid is controlled.

15. The display device according to claim 14, wherein an opening part of said switch is formed by a part of said structure which is physically opened, the opening part is opened in one place in said flow direction.

16. The display device according to claim 14, wherein an opening part of said switch is formed by a part of said structure which is physically opened, the opening part is opened in two places in said flow direction.

17. The display device according to claim 14, wherein
said liquid transfer means is made up of electric field applying means which selectively applies an electric field to the liquid repellent surface of the structure constituting said switch and to the liquid repellent surface covering the inner wall of said pixel.

18. The display device according to claim 17, wherein
said electric field applying means is a comb-teeth electrode which can generate an electric field in a direction parallel with a display surface.

19. The display device according to claim 14, wherein
when a liquid, in which a charged particle is dispersed, is used, said liquid transfer means is made up of electric field applying means which selectively applies an electric field to the liquid repellent surface of the structure constituting said switch and to the flow passage part except for said switch.

20. The display device according to claim 19, wherein said electric field applying means is a comb-teeth electrode which can generate an electric field in a direction parallel with a display surface.

* * * * *